United States Patent
Nakamura et al.

(10) Patent No.: US 8,815,980 B2
(45) Date of Patent: Aug. 26, 2014

(54) INK COMPOSITION FOR INKJET RECORDING, INKJET RECORDING METHOD AND PRINTED MATERIAL OBTAINED BY INKJET RECORDING

(75) Inventors: Ippei Nakamura, Ashigarakami-gun (JP); Hirokazu Kyota, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 107 days.

(21) Appl. No.: 13/155,133

(22) Filed: Jun. 7, 2011

(65) Prior Publication Data
US 2011/0305880 A1  Dec. 15, 2011

(30) Foreign Application Priority Data
Jun. 9, 2010  (JP) ................. 2010-132365

(51) Int. Cl.
*C09D 11/00* (2014.01)
*C08F 8/30* (2006.01)
*C08L 31/00* (2006.01)

(52) U.S. Cl.
USPC ............... 523/160; 524/555; 524/556

(58) Field of Classification Search
USPC ................ 523/160; 524/555, 556
See application file for complete search history.

(56) References Cited

U.S. PATENT DOCUMENTS

| | | | | |
|---|---|---|---|---|
| 4,879,325 A * | 11/1989 | Kimura et al. | ................ | 523/404 |
| 5,690,721 A * | 11/1997 | Itoh | ............. | 106/31.13 |
| 5,990,202 A | 11/1999 | Nguyen et al. | | |
| 6,057,384 A | 5/2000 | Nguyen et al. | | |
| 6,248,805 B1 | 6/2001 | Nguyen et al. | | |
| 6,281,280 B1 * | 8/2001 | Lin et al. | ........ | 524/542 |
| 6,417,249 B1 | 7/2002 | Nguyen et al. | | |
| 6,465,589 B2 | 10/2002 | Inukai et al. | | |
| 6,555,593 B1 * | 4/2003 | Hoyle et al. | ............. | 522/63 |
| 6,730,763 B1 * | 5/2004 | Okazaki et al. | ............. | 526/262 |
| 2001/0003764 A1 * | 6/2001 | Inukai et al. | ............ | 524/548 |
| 2002/0028302 A1 * | 3/2002 | Okazaki et al. | ............. | 427/487 |
| 2002/0136986 A1 * | 9/2002 | Chang et al. | ............ | 430/280.1 |
| 2004/0029044 A1 | 2/2004 | Severance et al. | | |
| 2007/0270568 A1 | 11/2007 | Ushiki et al. | | |
| 2008/0085950 A1 | 4/2008 | Ganapathiappan et al. | | |
| 2011/0120753 A1 | 5/2011 | Ushiki et al. | | |

FOREIGN PATENT DOCUMENTS

| | | |
|---|---|---|
| EP | 1 857 478 A1 | 11/2007 |
| JP | 2000-038533 A | 2/2000 |
| JP | 2001-521951 A | 11/2001 |
| JP | 2002-241702 A | 8/2002 |
| JP | 2005-060462 A | 3/2005 |
| JP | 2005-535745 A | 11/2005 |
| JP | 5222475 B2 | 3/2013 |

OTHER PUBLICATIONS

L. H. Sperling, "Introduction to Physical Polymer Science", John Wiley & Sons, Inc, New York, New York, pp. 6-7 and 97-98 (1992).*
Kotz et al "The Chemical World—Concepts and Applications", Harcourt Brace College Publishers, New York, pp. 125-128 (1994).*
Office Action dated Dec. 10, 2013 in Japanese Application No. 2010-132365.
European Search Report corresponding to European Patent Application No. 11168793.5 dated Sep. 2, 2011.
Office Action dated Jan. 23, 2014 in Chinese Application No. 201110159483.6.

* cited by examiner

*Primary Examiner* — Alexander Kollias
(74) *Attorney, Agent, or Firm* — Sughrue Mion, PLLC

(57) ABSTRACT

The invention provides an ink composition for inkjet recording, including:
a component (A) that is a compound having two or more groups each of which having a specific structure;
a component (B) that is at least one selected from the group consisting of organic solvents each of which having a specific structure; and
(C) a colorant.

7 Claims, No Drawings

INK COMPOSITION FOR INKJET RECORDING, INKJET RECORDING METHOD AND PRINTED MATERIAL OBTAINED BY INKJET RECORDING

CROSS-REFERENCE TO RELATED APPLICATIONS

This application is based on and claims priority under 35 USC 119 from Japanese Patent Application No. 2010-132365 filed on Jun. 9, 2010, the disclosure of which is incorporated by reference herein.

BACKGROUND

1. Technical Field

The invention relates to an ink composition for inkjet recording, an inkjet recording method and a printed material obtained by inkjet recording.

2. Related Art

Inkjet recording is a method in which recording is performed by ejecting a liquid ink composition from nozzles toward a recording medium by means of pressure, heat, an electric field or the like as a driving source. Since an inkjet recording method enables low running costs and improved image quality, the method has rapidly grown in popularity in recent years not only for office use but also for household use.

In recent years, a wide-format inkjet printer that is compliant with A-0 size has been developed and its use for outdoor applications, such as posters, has been increasing.

Japanese Patent Application Laid-Open (JP-A) No. 2002-241702 discloses a paint composition for outdoor use, the composition including a polymer having a maleimide structure, pigment and the like.

Further, a solvent-based pigment ink for inkjet printing in which a pigment and oleyl alcohol are used as a solvent pigment ink that contains an organic solvent is disclosed (see, for example, JP-A 2000-38533); and a solvent-type inkjet ink in which a pigment is contained and a normal paraffin, iso paraffin or a mixture thereof is used as a solvent is disclosed (see, for example, JP-A No. 2001-329193).

SUMMARY

According to an aspect of the present invention, there is provided an ink composition for inkjet recording, including:
a component (A) that is a compound having two or more groups represented by the following Formula (1);
a component (B) that is at least one selected from the group consisting of an organic solvent represented by the following Formula (2) and an organic solvent represented by the following Formula (3); and
(C) a colorant:

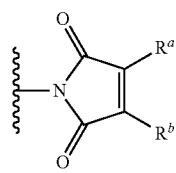
(1)

wherein in Formula (1), each of $R^a$ and $R^b$ independently represents an alkyl group having 1 to 4 carbon atoms, and $R^a$ and $R^b$ may be bonded to each other to form a four- to six-membered ring:

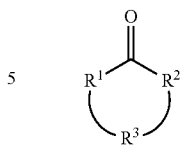
(2)

wherein in Formula (2), each of $R^1$ and $R^2$ independently represents $-CH_2-$, $-NR^6-$ or $-O-$; $R^1$ and $R^2$ are not both $-CH_2-$; $R^6$ represents an alkyl group having 1 to 3 carbon atoms, a hydroxyalkyl group having 1 to 3 carbon atoms, a hydroxyl group or a hydrogen atom; $R^3$ represents a hydrocarbon group represented by $-C_mH_{2m}-$, $-C_mH_{2m-2}-$ or $-C_mH_{2m-4}-$; and m is an integer from 2 to 8:

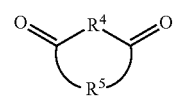
(3)

wherein in Formula (3), $R^4$ represents $-NR^7-$ or $-O-$; $R^7$ represents an alkyl group having 1 to 3 carbon atoms, a hydroxyalkyl group having 1 to 3 carbon atoms, a hydroxyl group or a hydrogen atom; $R^5$ represents a hydrocarbon group represented by $-C_nH_{2n}-$, $-C_nH_{2n-2}-$ or $-C_nH_{2n-4}-$; and n is an integer from 2 to 8.

DETAILED DESCRIPTION

[Ink Composition for Inkjet Recording]

The ink composition for inkjet recording according to the invention includes:
a component (A) that is a compound having two or more groups represented by the following Formula (1);
a component (B) that is at least one selected from the group consisting of an organic solvent represented by the following Formula (2) and an organic solvent represented by the following Formula (3); and
(C) a colorant.

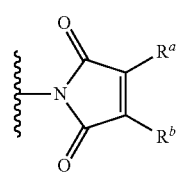
(1)

In Formula (1), each of $R^a$ and $R^b$ independently represents an alkyl group having 1 to 4 carbon atoms, and $R^a$ and $R^b$ may be bonded to each other to form a four- to six-membered ring.

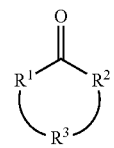
(2)

In Formula (2), each of $R^1$ and $R^2$ independently represents $-CH_2-$, $-NR^6-$ or $-O-$, $R^1$ and $R^2$ are not both —$CH_2$—, $R^6$ represents an alkyl group having 1 to 3 carbon atoms, a hydroxyalkyl group having 1 to 3 carbon atoms, a hydroxyl group or a hydrogen atom, $R^3$ represents a hydrocarbon group represented by —$C_mH_{2m}$—, —$C_mH_{2m-2}$— or —$C_mH_{2m-4}$—, and m is an integer from 2 to 8.

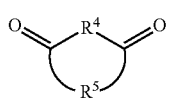

(3)

In Formula (3), $R^4$ represents —$NR^7$— or —O—, $R^7$ represents an alkyl group having 1 to 3 carbon atoms, a hydroxyalkyl group having 1 to 3 carbon atoms, a hydroxyl group or a hydrogen atom, $R^5$ represents a hydrocarbon group represented by —$C_nH_{2n}$—, —$C_nH_{2n-2}$— or —$C_nH_{2n-4}$—, and n is an integer from 2 to 8.

In the present specification, "A to B" refers to a range including A and B as the lower limit and the upper limit thereof.

In the present invention, the inventors have made intensive studies on ink compositions suitable for inkjet recording, and found that dischargeability of an ink composition is improved when it contains a specific compound having a maleimide structure and a colorant, and further an organic solvent having a specific structure in order to favorably dispersing the compound and the colorant. Although it is a matter of speculation and the present invention is not limited thereto, it is presumed that a favorable dispersed state of a colorant is maintained by interaction between a specific compound having a maleimide structure and an organic solvent having a specific structure, whereby an ink composition suitable for inkjet recording is obtained.

In the following, the ink composition for inkjet recording according to the invention (hereinafter, also simply referred to as "ink composition") will be described in detail.

((A) Compound Having Two or More Groups Represented by Formula (1))

The compound having two or more groups represented by Formula (1) used in the invention is not particularly limited, and any compound having two or more groups represented by Formula (1) in the molecule may be used. By using a compound having two or more groups represented by Formula (1), crosslink reaction of an ink composition can be facilitated.

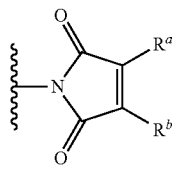

(1)

In Formula (1), each of $R^a$ and $R^b$ independently represents an alkyl group having 1 to 4 carbon atoms, and $R^a$ and $R^b$ may be bonded to each other to form a four- to six-membered ring.

In Formula (1), $R^a$ and $R^b$ may have a substituent or may not have a substituent, but $R^a$ and $R^b$ not having a substituent are preferred.

Each of $R^a$ and $R^b$ independently represents an alkyl group having 1 to 4 carbon atoms that may have a linear structure or a branched structure. Specific examples thereof include a methyl group, an ethyl group, a propyl group, an iso-propyl group, a butyl group, an iso-butyl group, a sec-butyl group and a t-butyl group. $R^a$ and $R^b$ may be bonded to each other to form a four- to six-membered ring. From the viewpoint of film properties of a cured film formed from the ink composition, such as solvent resistance after curing or adhesiveness with respect to a support, each of $R^a$ and $R^b$ is preferably independently an alkyl group having 1 or 2 carbon atoms, i.e., a methyl group or an ethyl group, particularly preferably a methyl group. When $R^a$ and $R^b$ are bonded to each other to form a four- to six-membered ring, a five- or six-membered ring is preferred and a six-membered ring is more preferred.

When these groups have a substituent, preferred examples thereof include an alkyl group having 1 to 8 carbon atoms, an alkoxy group having 1 to 8 carbon atoms, a hydroxyl group, a carboxyl group, a halogen atom, an alkyloxycarbonyl group having 2 to 7 carbon atoms, an alkylcarbonyloxy group having 2 to 7 carbon atoms, an aryloxycarbonyl group having 7 to 11 carbon atoms, an arylcarbonyloxy group having 7 to 11 carbon atoms, an alkylcarbamoyl group having 1 to 7 carbon atoms and an arylcarbamoyl group having 7 to 11 atoms. Among these, an alkyl group having 1 to 4 carbon atoms, an alkoxy group having 1 to 4 carbon atoms, a hydroxyl group, a carboxyl group and a halogen atom are more preferred. When at least one of $R^a$ or $R^b$ has a substituent selected from the above and carbon is included in the substituent, the number of carbon atoms in the substituent is not included in the number of carbon atoms of the alkyl group having 1 to 4 carbon atoms that represents $R^a$ or $R^b$. In the following, the number of carbon atoms included in a substituent is counted in the same way.

The component (A) may be a low-molecular compound having a molecular weight of from 300 to 2,000 or a high-molecular compound having a weight average molecular weight of 5,000 or more. From the viewpoint of solvent resistance after the ink composition is cured or adhesiveness with respect to a support, component (A) is preferably a high molecular compound having a weight average molecular weight of 5,000 or more.

When component (A) is a low-molecular compound having a molecular weight of from 300 to 2,000, the number of groups represented by Formula (1) in one molecule of component (A) is preferably from 2 to 6, more preferably from 2 to 4, further preferably 2 or 3, particularly preferably 2.

When component (A) is a low-molecular compound having a molecular weight of from 300 to 2,000, the compound is preferably represented by the following Formula (1-L).

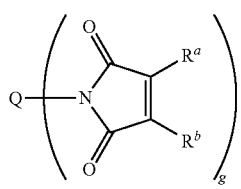

(1-L)

In Formula (1-L), each of $R^a$ and $R^b$ independently represents an alkyl group having 1 to 4 carbon atoms, and $R^a$ and $R^b$ may be bonded to each other to form a four- to six-membered ring. Q represents a g-valent linking group, and g is an integer of 2 or greater.

In Formula (1-L), each of $R^a$ and $R^b$ independently represents an alkyl group having 1 to 4 carbon atoms, and $R^a$ and $R^b$ may be bonded to each other to form a four- to six-membered ring.

Examples of $R^a$ and $R^b$ in Formula (1-L) are the same as the examples (and also preferred examples) of $R^a$ and $R^b$ in Formula (1).

In Formula (1-L), Q represents a g-valent linking group. Q is preferably a residual group formed by removing hydrogen atoms in an amount of g from a hydrocarbon group. When Q is a hydrocarbon group, an ether group, an ester group, an amino group, an amide bond, a silyl ether group, a thiol group or the like may exist in the hydrocarbon group. When Q is a hydrocarbon group, it is preferably a hydrocarbon group having 1 to 30 carbon atoms, more preferably a hydrocarbon group having 1 to 20 carbon atoms.

In Formula (1-L), g is an integer of 2 or greater, preferably from 2 to 6, more preferably from 2 to 4, further preferably 2 or 3, and particularly preferably 2.

In the invention, when component (A) is a low-molecular compound having a molecular weight of from 300 to 2,000, the following compounds (1-1) to (1-8) are preferably used.

(1-1)

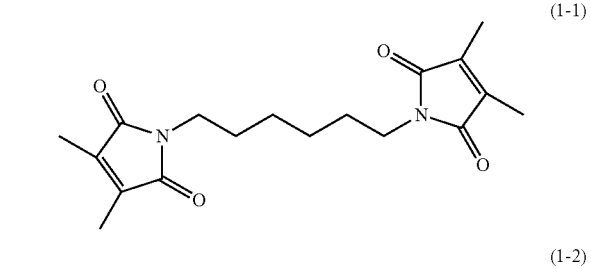

(1-2)

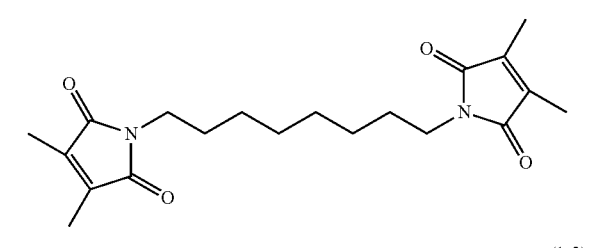

(1-3)

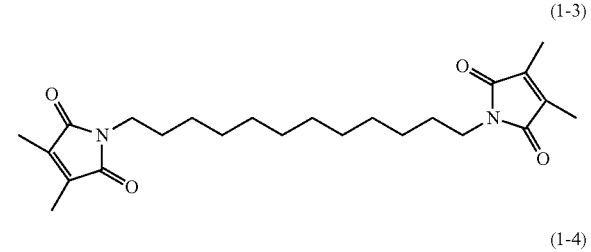

(1-4)

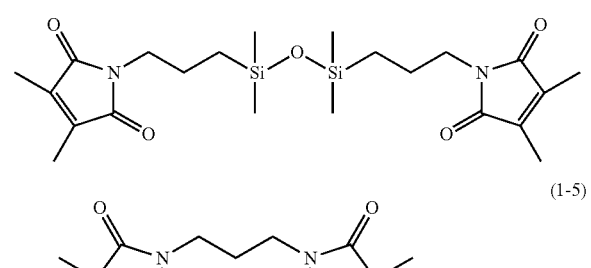

(1-5)

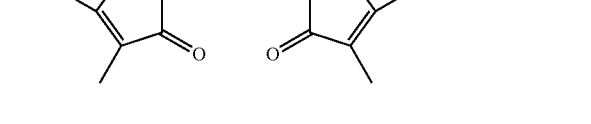

-continued (1-6)

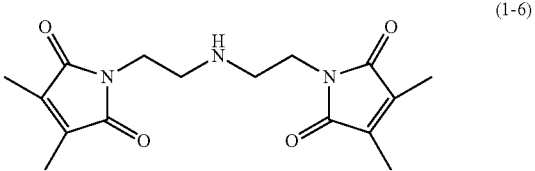

(1-7)

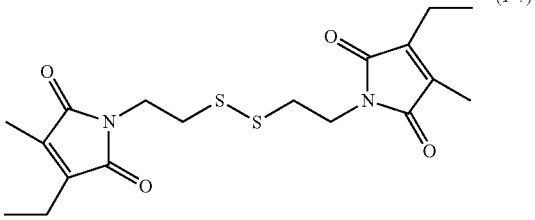

(1-8)

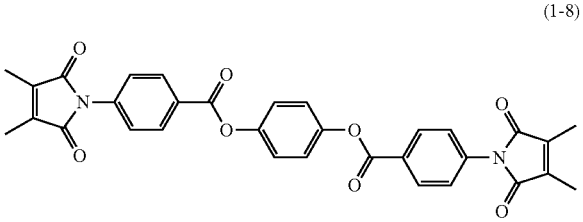

When component (A) is a high-molecular compound having a weight average molecular weight of 5,000 or more, the number of groups represented by Formula (1) in one molecule of component (A) is not particularly limited as long as it is two or more, but preferably from 2 to 500, more preferably from 10 to 200. Further, when component (A) is a high-molecular compound, it is preferred that at least one of the groups represented by Formula (1) is present in at least one side chain of the high-molecular compound, and it is more preferred that the two or more groups represented by Formula (1) are present in side chains of the high-molecular compound.

From the viewpoint of dischargeability of the ink composition by an inkjet method, the weight-average molecular weight is preferably from 5,000 to 200,000, more preferably from 7,000 to 100,000, further preferably from 10,000 to 50,000, and particularly preferably from 10,000 to 30,000.

The weight-average molecular weight is measured by gel permeation chromatography (GPC). The GPC is performed by using HLC-8020 GPC (trade name, manufactured by Tosoh Corporation) with columns (TSKGEL SUPER HZM-H, TSKGEL SUPER HZ400 and TSKGEL SUPER HZ200, trade names, manufactured by Tosoh Corporation, 4.6 mmID×15 cm) and THF (tetrahydrofuran) as an eluent.

When component (A) is a high-molecular compound having a weight average molecular weight of 5,000 or more, the polymer structure thereof is not particularly limited as long as it is a high-molecular compound having a group represented by Formula (1) either at a side chain or a distal end of the high-molecular compound, and examples of the polymer structure include polyacrylate, polyester, polyethylene imine and polystyrene. From the viewpoint of dischargeability of the ink composition by an inkjet method, solvent resistance of the ink composition after curing and adhesiveness with respect to a support, component (A) preferably has a polyacrylate structure.

When component (A) is a high-molecular compound, it is preferably a high-molecular compound including a structure represented by the following Formula (1').

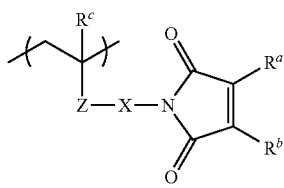

(1')

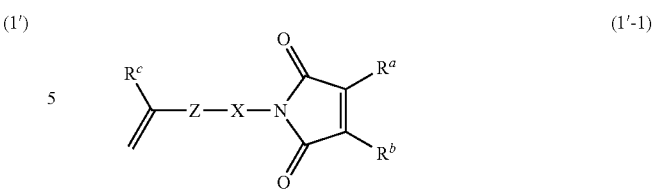

(1'-1)

In Formula (1'), each of $R^a$ and $R^b$ independently represents an alkyl group having 1 to 4 carbon atoms, and $R^a$ and $R^b$ may be bonded to each other to form a four- to six-membered ring. $R^c$ represents a hydrogen atom or a methyl group. Z represents —COO— or —CONR$^d$—, and $R^d$ represents a hydrogen atom or an alkyl group having 1 to 4 carbon atoms. X represents a divalent organic group.

In Formula (1'), each of $R^a$ and $R^b$ independently represents an alkyl group having 1 to 4 carbon atoms, and $R^a$ and $R^b$ may be bonded to each other to form a four- to six-membered ring. Examples of $R^a$ and $R^b$ (and also preferred examples) may be the same as the examples of $R^a$ and $R^b$ in Formula (1).

In Formula (1'), $R^c$ represents a hydrogen atom or a methyl group, preferably a methyl group.

In Formula (1'), Z represents —COO— or —CONR$^d$—, preferably —COO—.

$R^d$ represents a hydrogen atom or an alkyl group having 1 to 4 carbon atoms, and the alkyl group having 1 to 4 carbon atoms may have a linear structure or a branched structure. Specific examples of the alkyl group having 1 to 4 carbon atoms include a methyl group, an ethyl group, a propyl group, an iso-propyl group, a butyl group, an iso-butyl group, a sec-butyl group and a t-butyl group. $R^d$ preferably represents a hydrogen atom or an alkyl group having 1 or 2 carbon atoms, i.e., a methyl group or an ethyl group, particularly preferably a hydrogen atom. $R^d$ may have a substituent or may not have a substituent, but $R^d$ not having a substituent is preferred. Examples of the substituent include those previously mentioned.

In Formula (1'), X represents a divalent organic group. The divalent organic group is preferably an alkylene group having 2 to 20 carbon atoms. The alkylene group is preferably —(C$_i$H$_{2i}$)— or —(C$_{i+1}$H$_{2i}$)—, and i is preferably an integer from 2 to 20. The alkylene group may have a linear structure or a branched structure. An ether bond, an ester bond, an amide bond, a urethane bond or an arylene group may exist in the alkylene group. When X is an alkylene group, the carbon number thereof is preferably from 2 to 20, more preferably from 2 to 12, further preferably from 2 to 8.

Preferably, in Formula (1'), each of $R^a$ and $R^b$ independently represents an alkyl group having 1 or 2 carbon atoms, $R^c$ represents a methyl group, Z represents —COO—, X represents —(C$_i$H$_{2i}$)— or —(C$_{i+1}$H$_{2i}$)—, and i is an integer from 2 to 12.

When component (A) is a high-molecular compound including a structure represented by Formula (1'), the high-molecular compound is preferably a high-molecular compound obtained by polymerizing a monomer represented by the following Formula (1'-1). The high-molecular compound may be obtained by polymerizing a monomer represented by the following Formula (1'-1) alone or by copolymerizing the monomer with a further monomer, but from the viewpoint of controlling the properties of a film obtained from the ink composition after being cured, the high-molecular compound is preferably a copolymer.

In Formula (1'-1), each of $R^a$ and $R^b$ independently represents an alkyl group having 1 to 4 carbon atoms, and $R^a$ and $R^b$ may be bonded to each other to form a four- to six-membered ring. $R^c$ represents a hydrogen atom or a methyl group. Z represents —COO— or —CONR$^d$—, and $R^d$ represents a hydrogen atom or an alkyl group having 1 to 4 carbon atoms. X represents a divalent organic group.

In Formula (1'-1), the definitions of $R^a$, $R^b$, $R^c$, Z and X are the same as that in Formula (1'), and preferred ranges thereof are also the same.

Preferred examples of the monomer represented by Formula (1'-1) include the following compounds (1-1-1) to (1-1-16), but the invention is not limited to these compounds.

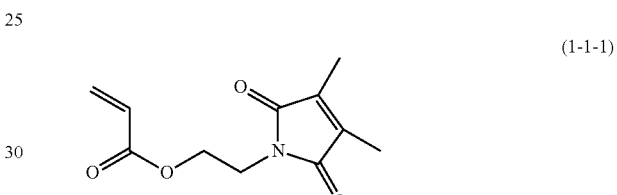

(1-1-1)

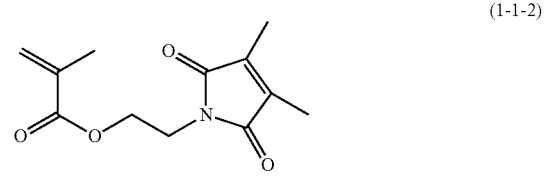

(1-1-2)

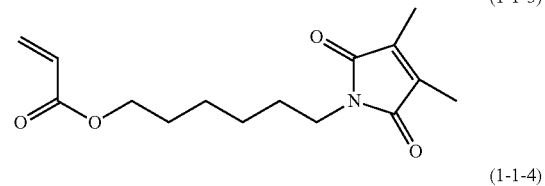

(1-1-3)

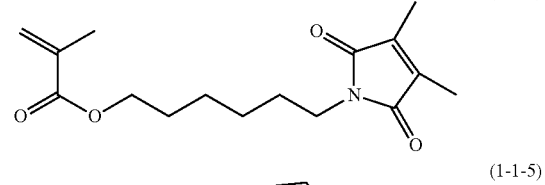

(1-1-4)

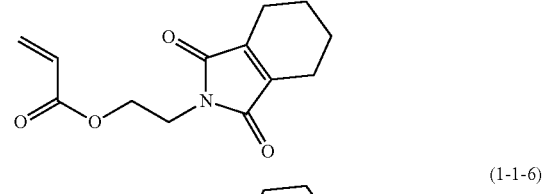

(1-1-5)

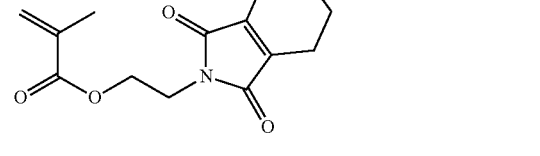

(1-1-6)

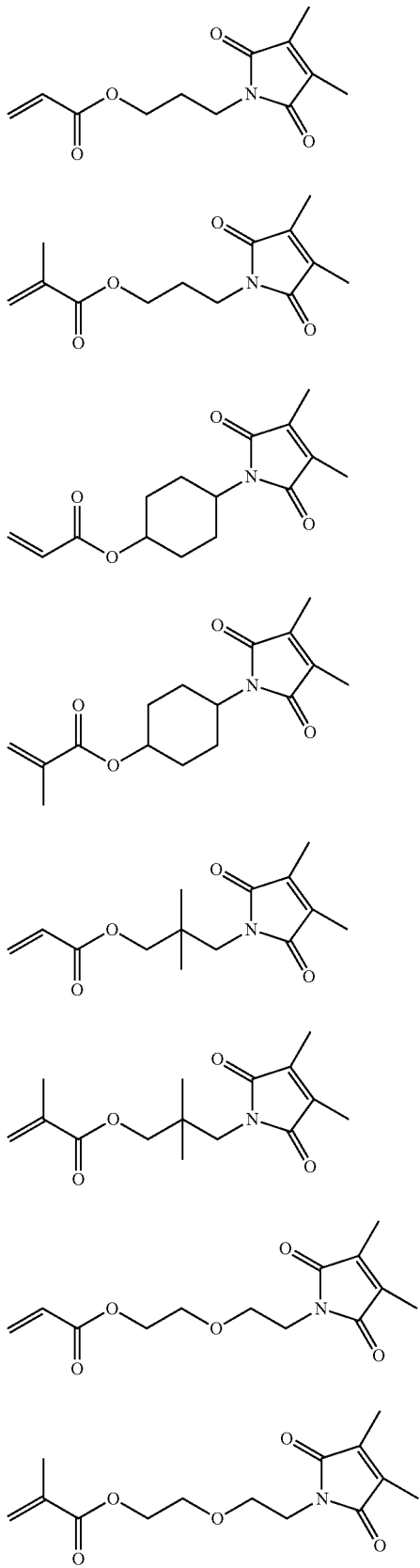

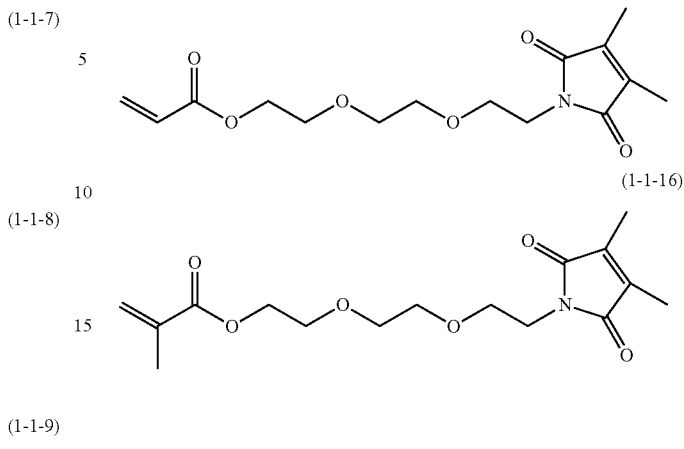

Examples of the monomer that can be copolymerized with a monomer represented by (1'-1) include styrene, p-methoxystyrene, methyl(meth)acrylate, ethyl(meth)acrylate, allyl (meth)acrylate, butyl(meth)acrylate, hexyl(meth)acrylate, 2-ethylhexyl(meth)acrylate, octyl(meth)acrylate, decyl (meth)acrylate, stearyl(meth)acrylate, cyclohexyl(meth) acrylate, bornyl(meth)acrylate, isobornyl(meth)acrylate, benzyl(meth)acrylate, 2-ethylhexyl diglycol(meth)acrylate, butoxyethyl(meth)acrylate, butoxymethyl(meth)acrylate, 3-methoxybutyl(meth)acrylate, 2-(2-methoxyethoxy)ethyl (meth)acrylate, 2-(2-butoxyethoxy)ethyl(meth)acrylate, 2,2,2-tetrafluoroethyl(meth)acrylate, 1H,1H,2H,2H-perfluorodecyl(meth)acrylate, 4-butylphenyl(meth)acrylate, phenyl (meth)acrylate, 2,4,5-tetramethylphenyl(meth)acrylate, 4-chlorophenyl(meth)acrylate, phenoxymethyl(meth)acrylate, phenoxyethyl(meth)acrylate, glycidyl(meth)acrylate, glycidyloxybutyl(meth)acrylate, glycidyloxyethyl(meth) acrylate, glycidyloxypropyl(meth)acrylate, tetrahydrofurfuryl(meth)acrylate, 2-hydroxyethyl(meth)acrylate, 3-hydroxypropyl(meth)acrylate, 2-hydroxypropyl(meth)acrylate, 2-hydroxybutyl(meth)acrylate, 4-hydroxybutyl(meth)acrylate, 3-hydroxypropyl(meth)acrylate, 2-methacryloyloxyethyl succinate, 2-methacryloyloxyhexahydro phthalate, 2-methacryloyloxyethyl-2-hydroxypropyl phthalate, butoxydiethylene glycol(meth)acrylate, trifluoroethyl(meth)acrylate, perfluorooctylethyl(meth)acrylate, 2-hydroxy-3-phenoxypropyl(meth)acrylate, (meth)acrylamide, N-butyl (meth)acrylamide, N-p-hydroxyphenyl(meth)acrylamide and p-sulfamoylphenyl(meth)acrylamide.

The monomer that can be copolymerized with a monomer represented by Formula (1'-1) is preferably an alkyl(meth) acrylate having 1 to 8 carbon atoms, such as methyl(meth) acrylate, ethyl(meth)acrylate, butyl(meth)acrylate, hexyl (meth)acrylate and 2-ethylhexyl(meth)acrylate.

Other known monomers than the above may also be used, as necessary.

When component (A) is a copolymer, it preferably includes a structure represented by the following Formula (A').

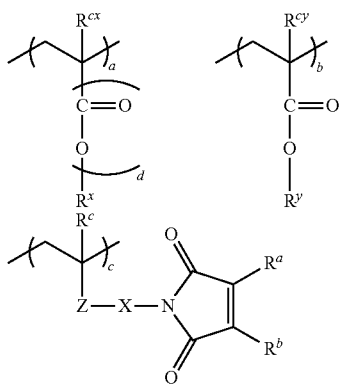

(A')

In Formula (A'), each of $R^a$ and $R^b$ independently represents an alkyl group having 1 to 4 carbon atoms, and $R^a$ and $R^b$ may be bonded to each other to form a four- to six-membered ring. Each of $R^c$, $R^{cx}$ and $R^{cy}$ independently represents a hydrogen atom or a methyl group. Each of $R^x$ and $R^y$ independently represents a hydrogen atom, an alkyl group having 1 to 10 carbon atoms or an aryl group having 6 to 20 carbon atoms. Z represents —COO— or —CONR$^d$—, and $R^d$ represents a hydrogen atom or an alkyl group having 1 to 4 carbon atoms. X represents a divalent organic group. a, b and c represent the copolymerization ratio in the high-molecular compound, and the total of a, b and c is 100. d is 0 or 1.

In Formula (A'), the definitions of $R^a$, $R^b$, $R^c$, Z and X are the same as that in Formula (1'), and preferred ranges thereof are also the same.

In Formula (A'), each of $R^{cx}$ and $R^{cy}$ independently represents a hydrogen atom or a methyl group. Both of $R^{cx}$ and $R^{cy}$ are preferably a methyl group.

In Formula (A'), each of $R^x$ and $R^y$ independently represents a hydrogen atom, an alkyl group having 1 to 10 carbon atoms or an aryl group having 6 to 20 carbon atoms. These groups may have a substituent or may not have a substituent, and may have either a linear structure or a branched structure. These groups may form a salt, as necessary. Specific examples of the groups include a methyl group, an ethyl group, a propyl group, an isopropyl group, a butyl group, an iso-butyl group, a sec-butyl group, a t-butyl group, a pentyl group, a hexyl group, an octyl group, a phenyl group and a naphthyl group. Among these, an alkyl group having 1 to 8 carbon atoms is preferred, and an alkyl group having 1 to 6 carbon atoms is more preferred.

These groups may have a substituent, and preferred examples of the substituent include an alkyl group having 1 to 8 carbon atoms, an aryl group having 6 to 20 carbon atoms, an alkoxy group having 1 to 8 carbon atoms, a hydroxyl group, a carboxyl group, a halogen atom, an alkyloxycarbonyl group having 2 to 7 carbon atoms, an alkylcarbonyloxy group having 2 to 7 carbon atoms, an aryloxycarbonyl group having 7 to 11 carbon atoms, an arylcarbonyloxy group having 7 to 11 carbon atoms, an alkylcarbamoyl group having 1 to 7 carbon atoms and an arylcarbamoyl group having 7 to 11 carbon atoms. Among these, an alkyl group having 1 to 4 carbon atoms, an alkoxy group having 1 to 4 carbon atoms, a hydroxyl group, a carboxyl group and a halogen atom are more preferred. When at least one of $R^x$ or $R^y$ has a substituent as mentioned above and carbon is included in the substituent, the number of carbon atoms of the substituent is not included in the 1 to 10 carbon atoms of the alkyl group represented by $R^x$ or $R^y$.

In Formula (A'), a, b and c represent the copolymerization ratio in the high-molecular compound, and the total of a, b and c is 100. The copolymerization ratio preferably satisfies $30 \le a+b \le 90$ and $10 \le c \le 70$, more preferably $40 \le a+b \le 90$ and $10 \le c \le 60$.

In Formula (A'), d is 0 or 1, preferably 1.

Specific examples of component (A) include the following compounds (A-1) to (A-15), but the invention is not limited to these compounds.

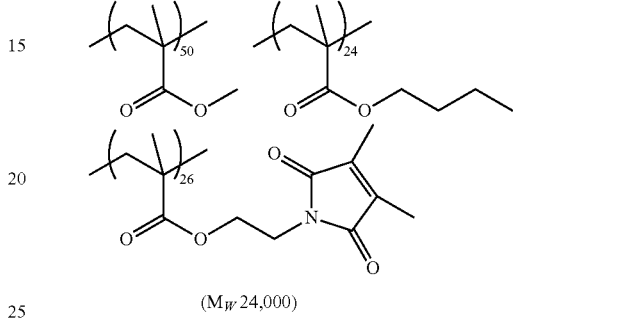

(A-1)

($M_W$ 24,000)

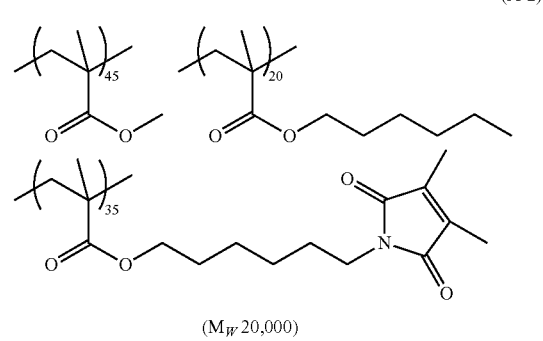

(A-2)

($M_W$ 20,000)

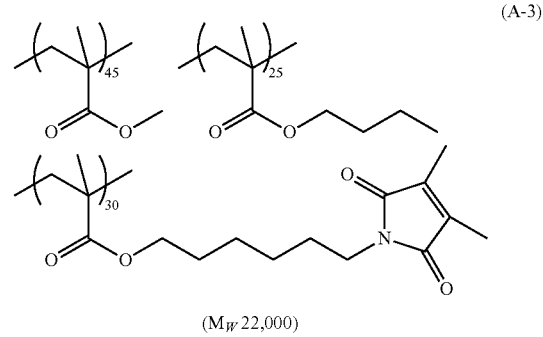

(A-3)

($M_W$ 22,000)

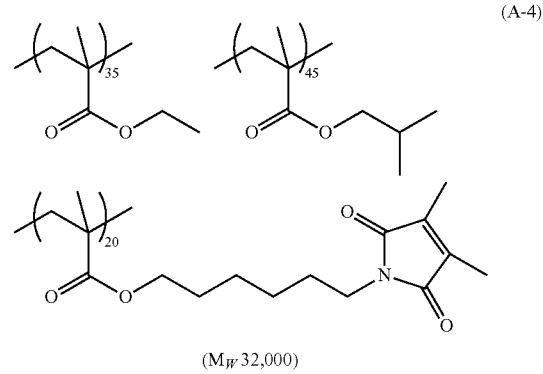

(A-4)

($M_W$ 32,000)

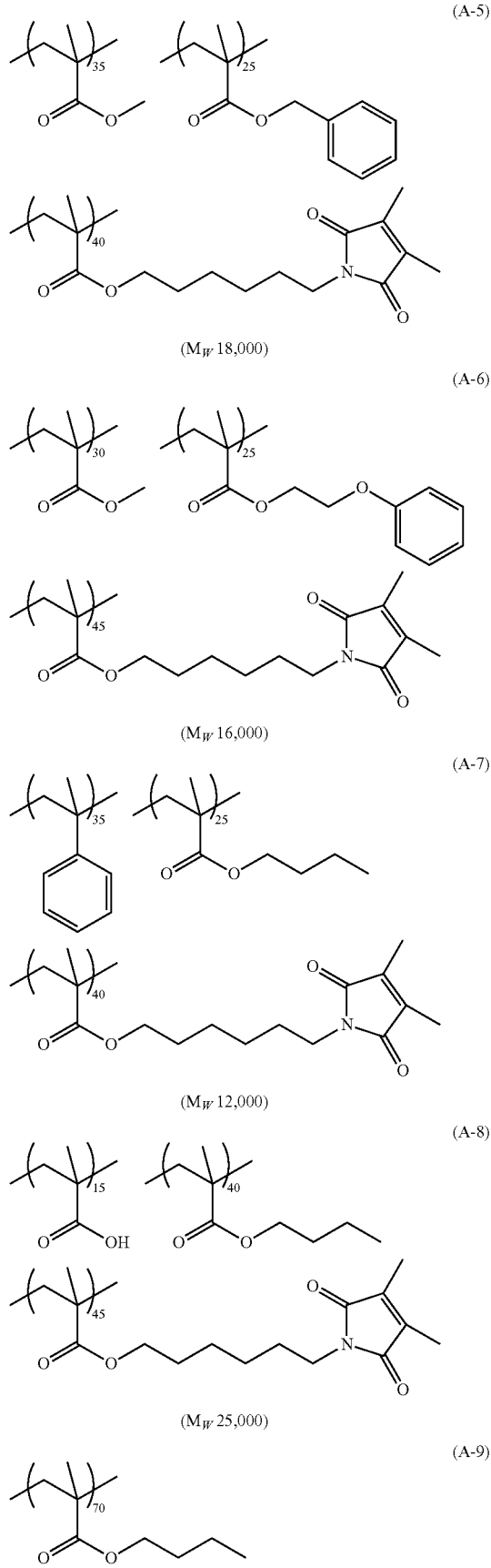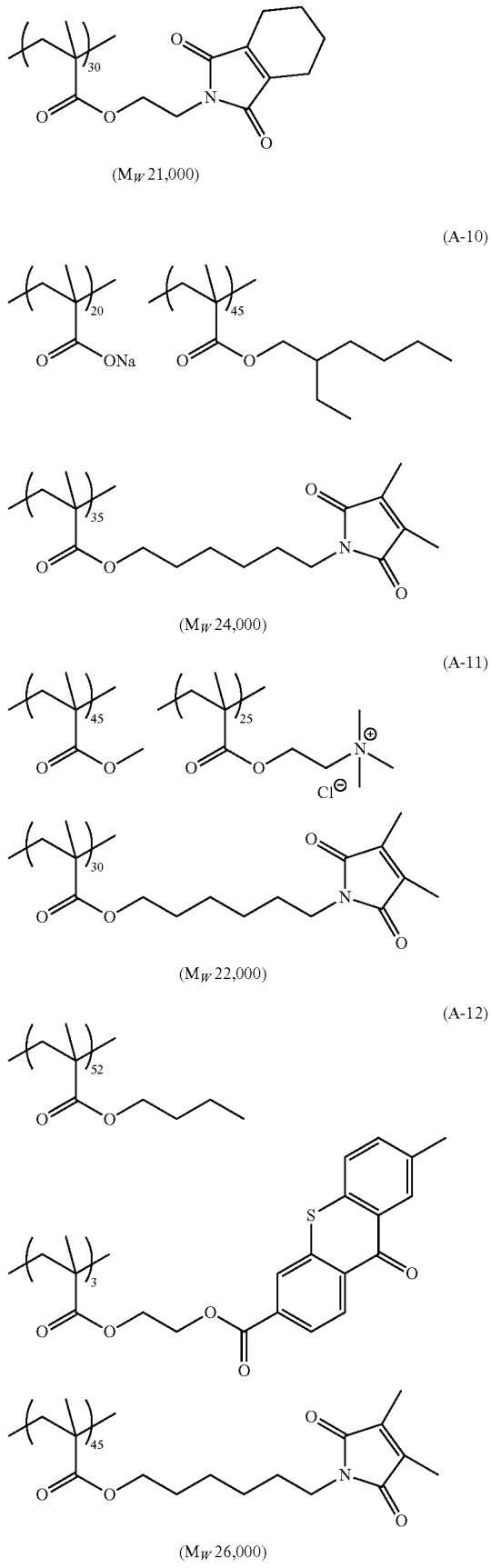

-continued

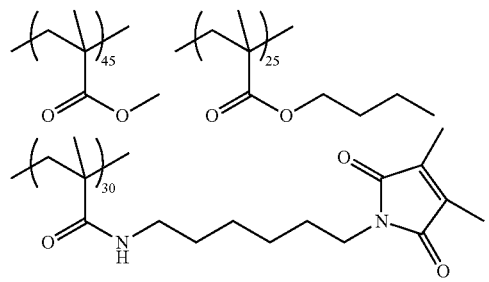

(A-13)

($M_W$ 22,000)

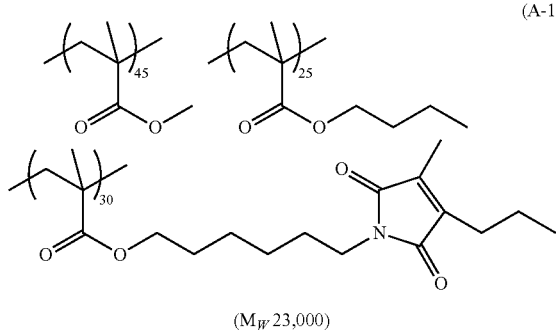

(A-14)

($M_W$ 23,000)

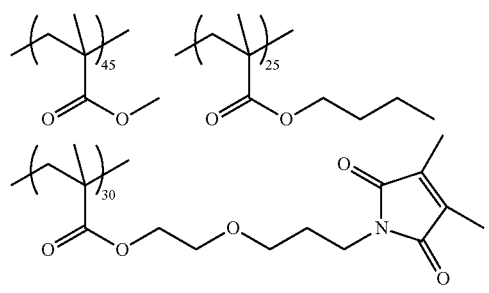

(A-15)

($M_W$ 22,000)

In the invention, compounds (A-1) to (A-6) are preferably used as component (A), particularly preferably compounds (A-2) to (A-4).

Generally, component (A) and a precursor thereof can be produced by a known method. For example, low-molecular compounds, such as compounds (1-1) to (1-8), can be produced by a method described in the United States Patent Publication No. 2009/0224203 A1, Syn lett Vol. 13, pp. 2172-2176 (2009), Journal of Polymer Science Part A-1 Polymer Chemistry Vol. 10, No. 6, pp. 1687-1699 (1972), or the like. Acrylates used as a precursor of the high-molecular compounds, such as compounds (1-1-1) to (1-1-16), can be produced by a method described in JP-A Nos. 52-988 and 4-251258. High-molecular compounds, such as compounds (A-1) to (A-15), can be produced by polymerizing the precursor as mentioned above according to a known polymerization method, such as a method described in JP-A Nos. 52-988 and 55-154970, Langmuir Vol. 18, No. 14, pp. 5414-5421 (2002), or the like.

The content of component (A) in the ink composition for inkjet recording is preferably from 1 to 50% by weight, more preferably from 2 to 35% by weight, further preferably from 5 to 30% by weight.

When the content of component (A) in the ink composition is 1% by weight or more, a cured film having favorable properties can be obtained and when the content of component (A) in the ink composition is 50% by weight or less, favorable ink viscosity can be maintained.

(At Least One Kind of Organic Solvent Selected from Organic Solvents Represented by Formula (2) or Formula (3))

The ink composition according to the invention contains at least one kind of organic solvent selected from a group consisting of an organic solvent represented by Formula (2) and an organic solvent represented by Formula (3).

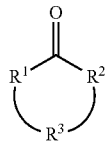

(2)

In Formula (2), each of $R^1$ and $R^2$ independently represents —$CH_2$—, —$NR^6$— or —O—, but $R^1$ and $R^2$ are not both —$CH_2$—. $R^6$ represents an alkyl group having 1 to 3 carbon atoms, a hydroxyalkyl group having 1 to 3 carbon atoms, a hydroxyl group or a hydrogen atom. $R^3$ represents a hydrocarbon atom represented by —$C_mH_{2m}$—, —$C_mH_{2m-2}$— or —$C_mH_{2m-4}$—, m represents an integer from 2 to 8.

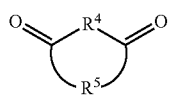

(3)

In Formula (3), $R^4$ represents —$NR^7$— or —O—. $R^7$ represents an alkyl group having 1 to 3 carbon atoms, a hydroxyalkyl group having 1 to 3 carbon atoms, a hydroxyl group or a hydrogen atom. $R^5$ represents a hydrocarbon group represented by —$C_nH_{2n}$—, —$C_nH_{2n-2}$— or —$C_nH_{2n-4}$—. n represents an integer from 2 to 8.

In Formula (2), each of $R^1$ and $R^2$ independently represents —$CH_2$—, —$NR^6$— or —O—, but $R^1$ and $R^2$ are not both —$CH_2$—. $R^6$ represents an alkyl group having 1 to 3 carbon atoms, a hydroxyalkyl group having 1 to 3 carbon atoms, a hydroxyl group or a hydrogen atom. $R^6$ may have a substituent or may not have a substituent. $R^6$ is preferably an alkyl group having 1 to 3 carbon atoms, a hydroxyalkyl group having 1 to 3 carbon atoms or a hydrogen atom, more preferably an alkyl group having 1 to 3 carbon atoms or a hydrogen atom. It is preferred that at least one of $R^1$ or $R^2$ is —O—, more preferably both are —O—, i.e., the organic solvent represented by Formula (2) has a carbonate group.

In Formula (2), $R^3$ represents a hydrocarbon atom represented by —$C_mH_{2m}$—$C_mH_{2m-2}$—or —$C_mH_{2m-4}$. m represents an integer from 2 to 8. m in $R^3$ is preferably an integer from 2 to 6, more preferably an integer from 2 to 4, further preferably 2 or 3. $R^3$ is preferably —$C_mH_{2m}$— or —$C_mH_{2m-2}$—, more preferably —$C_mH_{2m}$—. $R^3$ may have a linear structure or a branched structure.

Specific examples of $R^3$ include an ethylene group, a 1-methylethylene group and a propylene group. Among these, an ethylene group and a 1-methylethylene group are particularly preferred.

Specific examples of the organic solvent represented by Formula (2) include ethylene carbonate, propylene carbonate, 3-methyl-2-oxazolidinone, 3-ethyl-2-oxazolidinone, 3-propyl-2-oxazolidinone, 1,3-dimethyl-2-imidazolidinone, 2-pyrrolidone, 1-methyl-2-pyrrolidone and γ-butyrolactone. However, the invention is not limited to these compounds.

Preferably, in a compound represented by Formula (2), both of $R^1$ and $R^2$ are —O—, and $R^3$ is —$C_2H_4$— or —$C_3H_6$—. Examples of such compounds include ethylene carbonate and propylene carbonate.

In Formula (3), $R^4$ represents —$NR^7$— or —O—. $R^7$ represents an alkyl group having 1 to 3 carbon atoms, a hydroxyalkyl group having 1 to 3 carbon atoms, a hydroxyl group or a hydrogen atom. $R^7$ may have a substituent or may not have a substituent. $R^4$ is more preferably —$NR^7$—. $R^7$ preferably represents an alkyl group having 1 to 3 carbon atoms, a hydroxyalkyl group having 1 to 3 carbon atoms or a hydrogen atom, more preferably an alkyl group having 1 to 3 carbon atoms or a hydrogen atom.

In Formula (3), $R^5$ represents a hydrocarbon group represented by —$C_nH_{2n}$—, —$C_nH_{2n-1}$— or —$C_nH_{2n-4}$—. n represents an integer from 2 to 8. n in $R^5$ is preferably an integer from 2 to 6, more preferably an integer from 2 to 4, further preferably 2 or 3. $R^5$ preferably represents —$C_nH_{2n}$— or —$C_nH_{2n-2}$—, more preferably —$C_nH_{2n}$—. $R^5$ may have a linear structure or a branched structure.

Specific examples of $R^5$ are the same as that of $R^3$ in Formula (2), and preferred examples thereof are also the same.

Specific examples of the organic solvent represented by Formula (3) include N-ethyl succinimide, glutaric anhydride and 3-methyl glutaric anhydride. However, the invention is not limited to these organic solvents.

In the invention, an organic solvent represented by Formula (2) is more preferably used, compared with an organic solvent represented by Formula (3).

Further, the ink composition according to the invention preferably contains at least an organic solvent represented by Formula (2), more preferably at least a compound having a carbonate group represented by Formula (2).

The ink composition according to the invention preferably includes, as component (B), at least one kind of a cyclic urea compound, an oxazolidinone compound (such as 3-methyl-2-oxazolidinone, 3-ethyl-2-oxazolidinone or 3-propyl-2-oxazolidinone) or a cyclic carbonate compound. More preferably, the ink composition according to the invention includes a cyclic carbonate compound, particularly preferably ethylene carbonate or propylene carbonate. By including an organic solvent such as these, an ink composition that exhibits favorable dischargeability, solvent resistance and adhesiveness can be obtained.

The content of component (B) in the ink composition is preferably from 10 to 90% by weight, more preferably from 20 to 80% by weight, further preferably from 30 to 75% by weight.

(Component (C) Colorant)

The ink composition according to the invention contains a colorant as component (C).

The colorant that may be used in the invention is not particularly limited, and may be selected from known colorants such as pigments, oil-soluble dyes, water-soluble dyes and disperse dyes. Among these, the colorant preferably includes at least one selected from the group consisting of a pigment and an oil-soluble dye, more preferably a pigment.

<Pigment>

The pigment is not particularly limited and may be selected as appropriate according to purposes. Examples of the pigment include known organic pigments and inorganic pigments, and resin particles dyed with a dye, and commercially available pigment dispersions and surface-treated pigments (for example, dispersions in which a pigment is dispersed in a medium such as water, liquid organic compound or insoluble resin, and pigment having a surface treated with a resin, a pigment derivative or the like). The pigment may be those described in, for example, "Ganryo no Jiten (Dictionary of Pigment)", edited by Seijiro Ito (2000, published by Asakura Publishing Co., Ltd.), "Yuki Ganryo Handbook (Organic Pigment Handbook)", authored by Isao Hashimoto (2006, published by Color Office), "Industrial Organic Pigments", edited by K. Hunger (1992, published by Wiley-VHC), JP-A No. 2002-12607, JP-A No. 2002-188025, JP-A No. 2003-26978, JP-A No. 2003-342503 and JP-A No. 2009-235370.

The organic pigments and inorganic pigments include, for example, yellow pigments, red pigments, magenta pigments, blue pigments, cyan pigments, green pigments, orange pigments, violet pigments, brown pigments, black pigments and white pigments.

Preferred examples of yellow pigments include monoazo pigments such as C. I. Pigment Yellow 1, 2, 3, 4, 5, 10, 65, 73, 74, 75, 97, 98, 111, 116, 130, 167 and 205; monoazo lake pigments such as C. I. Pigment Yellow 61, 62, 100, 168, 169, 183, 191, 206, 209 and 212; disazo pigments such as C. I. Pigment Yellow 12, 13, 14, 16, 17, 55, 63, 77, 81, 83, 106, 124, 126, 127, 152, 155, 170, 172, 174, 176, 214 and 219; anthraquinone pigments such as C. I. Pigment Yellow 24, 99, 108, 193 and 199; monoazo pyrazolone pigments such as C. I. Pigment Yellow 60; condensed azo pigments such as C. I. Pigment Yellow 93, 95, 128 and 166; isoindoline pigments such as C. I. Pigment Yellow 109, 110, 139, 173 and 185; benzimidazolone pigments such as C. I. Pigment Yellow 120, 151, 154, 175, 180, 181 and 194; azomethine metal complex pigments such as C. I. Pigment Yellow 127, 129, 150 and 153; quinophthalone pigments such as C. I. Pigment Yellow 138; and quinoxaline pigments such as C. I. Pigment Yellow 213.

Preferred examples of red or magenta pigments include monoazo lake pigments such as C. I. Pigment Red 193; disazo pigments such as C. I. Pigment Red 38; naphthol AS pigments such as C. I. Pigment Red 2, 5, 8, 9, 10, 11, 12, 14, 15, 16, 17, 18, 22, 23, 31, 32, 112, 114, 146, 147, 150, 170, 184, 187, 188, 210, 213, 238, 245, 253, 256, 258, 266, 268 and 269; β-naphthol pigments such as C. I. Pigment Red 3, 4 and 6; β-naphthol lake pigments such as C. I. Pigment Red 49, 53 and 68; naphthol AS lake pigments such as C. I. Pigment Red 237, 239 and 247; pyrazolone pigments such as C. I. Pigment Red 41; BONA lake pigments such as C. I. Pigment Red 48, 52, 57, 58, 63, 64:1 and 200; xanthene lake pigments such as C. I. Pigment Red 81:1, 169 and 172; thioindigo pigments such as C. I. Pigment Red 88, 181 and 279; perylene pigments such as C. I. Pigment Red 123, 149, 178, 179, 190 and 224; condensed azo pigments such as C. I. Pigment Red 144, 166, 214, 220, 221, 242 and 262; anthraquinone pigments such as C. I. Pigment Red 168, 177, 182, 226 and 263; anthraquinone lake pigments such as C. I. Pigment Red 83; benzimidazolone pigments such as C. I. Pigment Red 171, 175, 176, 185 and 208; quinacridone pigments such as C. I. Pigment Red 122, 202 (including a mixture with C. I. Pigment Violet 19), 207 and 209; diketopyrrolopyrrole pigments such as C. I. Pigment Red 254, 255, 264, 270 and 272; and azomethine metal complex pigments such as C. I. Pigment Red 257 and 271.

Examples of the blue or cyan pigments include naphthol AS pigments such as C. I. Pigment Blue 25 and 26; phthalocyanine pigments such as C. I. Pigment Blue 15, 15:1, 15:2, 15:3, 15:4, 15:6, 16, 17:1, 75 and 79; dye lake pigments such as C. I. Pigment Blue 1, 24:1, 56, 61 and 62; anthraquinone pigments such as C. I. Pigment Blue 60; indigo pigments such as C. I. Pigment Blue 63; and dioxazine pigments such as C. I. Pigment Blue 80.

Examples of the green pigments include dye lake pigments such as C. I. Pigment Green 1 and 4; phthalocyanine pigments such as C. I. Pigment Green 7 and 36; and azomethine pigments such as C. I. Pigment Green 8.

Examples of the orange pigments include monoazo pigments such as C. I. Pigment Orange 1; β-naphthol pigments such as C. I. Pigment Orange 2, 3 and 5; naphthol AS pigments such as C. I. Pigment Orange 4, 24, 38 and 74; pyrazolone pigments such as C. I. Pigment Orange 13 and 34; benzimidazolone pigments such as C. I. Pigment Orange 36, 60, 62, 64 and 72; disazo pigments such as C. I. Pigment Orange 15 and 16; β-naphthol lake pigments such as C. I. Pigment Orange 17 and 46; naphthalene sulfonic acid lake pigments such as C. I. Pigment Orange 19; perinone pigments such as C. I. Pigment Orange 43; quinacridone pigments such as C. I. Pigment Orange 48 and 49; anthraquinone pigments such as C. I. Pigment Orange 51; isoindolinone pigments such as C. I. Pigment Orange 61; isoindoline pigments such as C. I. Pigment Orange 66; azomethine metal complex pigments such as C. I. Pigment Orange 68; and diketopyrrolopyrrole pigments such as C. I. Pigment Orange 71, 73 and 81.

Examples of the brown pigments include BONA lake pigments such as C. I. Pigment Brown 5; condensed azo pigments such as C. I. Pigment Brown 23, 41 and 42; and benzimidazolone pigments such as C. I. Pigment Brown 25 and 32.

Examples of the violet pigments include dye lake pigments such as C. I. Pigment Violet 1, 2, 3 and 27; naphthol AS pigments such as C. I. Pigment Violet 13, 17, 25 and 50; anthraquinone lake pigments such as C. I. Pigment Violet 5:1; quinacridone pigments such as C. I. Pigment Violet 19; dioxazine pigments such as C. I. Pigment Violet 23 and 37; perylene pigments such as C. I. Pigment Violet 29; benzimidazolone pigments such as C. I. Pigment Violet 32; and thioindigo pigments such as C. I. Pigment Violet 38.

Examples of the black pigments include indazine pigments such as C. I. Pigment Black 1; carbon black as C. I. Pigment Black 7; graphite as C. I. Pigment Black 10; magnetite as C. I. Pigment Black 11; anthraquinone pigments such as C. I. Pigment Black 20; and perylene pigments such as C. I. Pigment Black 31 and 32.

Examples of the white pigments include zinc oxide as C. I. Pigment White 4; titanium oxide as C. I. Pigment White 6; zinc sulfide as C. I. Pigment White 7; zirconium oxide (zirconium white) as C. I. Pigment White 12; calcium carbonate as C. I. Pigment White 18; aluminum oxide/silicon oxide (kaolin clay) as C. I. Pigment White 19; barium sulfate as C. I. Pigment White 21 or 22; aluminum hydroxide (alumina white) as C. I. Pigment White 23; silicon oxide as C. I. Pigment White 27; and calcium silicate as C. I. Pigment White 28.

Inorganic particles used in white pigments may be a simple substance, oxides or organic metal compounds of silicon, aluminum, zirconium, titanium or the like, or composite particles with an organic compound.

Among these, titanium oxide is suitably used due to its smaller specific gravity, smaller refractive index, stronger masking or coloring properties compared with other white pigments, and its excellent resistance with respect to acid, alkali and other environments. It is also possible to use titanium oxide and another white pigment (not limited to the aforementioned white pigments) in combination.

It is preferred to select the type of pigment, dispersant or medium and adjust the conditions for dispersion or filtration such that the pigment particles have a volume average particle diameter of preferably from 0.005 to 0.5 µm, more preferably from 0.01 to 0.45 µm, further preferably from 0.015 to 0.4 µm. When the volume average particle diameter is within the above range, the effect of the invention can be further enhanced.

In the invention, the average particle diameter and the particle diameter distribution of the particles are obtained by measuring a volume average particle diameter by a dynamic light scattering method with a commercially available particle size analyzer such as NANOTRAC UPA-EX150 (trade name, manufactured by Nikkiso Co., Ltd).

<Oil-Soluble Dyes>

In the following, oil-soluble dyes that may be used in the invention will be described.

The oil-soluble dyes that may be used in the invention refers to a dye that is substantially insoluble in water, specifically, dyes having a solubility in water at 25° C. of 1 g or less (mass of dye that can dissolve in 100 g of water), preferably 0.5 g or less, more preferably 0.1 g or less. Accordingly, oil-soluble dyes include pigments, which are insoluble in water, and oil-soluble colorants. Among these, oil-soluble colorants are preferred.

Any yellow dyes may be appropriately selected from the oil-soluble dyes that may be used in the invention, and used.

Examples of the yellow dyes include aryl or heteryl azo dyes having, as a coupling component, phenols, naphthols, anilines, pyrazolones, pyridones or open chain-type active methylated compounds; azomethine dyes having, as a coupling component, open chain-type active methylated compounds; methine dyes such as benzylidene dyes and monomethine oxonol dyes; and quinone dyes such as naphthoquinone dyes and anthraquinone dyes. Other examples of dyes include quinophthalone dyes, nitro dyes, nitroso dyes, acridine dyes and acridinone dyes.

Any magenta dyes may be appropriately selected from the oil-soluble dyes that may be used in the invention, and used.

Examples of the magenta dyes include aryl or heteryl azo dyes having, as a coupling component, phenols, naphthols or anilines; azomethine dyes having, as a coupling component, pyralozones or pyrazolotriazoles; methine dyes such as arylidene dyes, styryl dyes, merocyanine dyes and oxonol dyes; carbonium dyes such as diphenyl methane dyes, triphenyl methane dyes and xanthene dyes; quinone dyes such as naphthoquinone, anthraquinone and anthrapyridone; and condensed polycyclic dyes such as dioxazine dyes.

Any cyan dyes may be appropriately selected from the oil-soluble dyes that may be used in the invention, and used.

Examples of the cyan dyes include indoaniline dyes, indophenol dyes and azomethine dyes having, as a coupling component, pyrrolotriazoles; polymethine dyes such as cyanine dyes, oxonol dyes and merocyanine dyes; carbonium dyes such as diphenyl methane dyes, triphenyl methane dyes and xanthene dyes; phthalocyanine dyes; anthraquinone dyes; aryl or heteryl azo dyes having, as a coupling component, phenols, naphthols or anilines; and indigo or thioindigo dyes.

The dyes mentioned above may exhibit a color of yellow, magenta or cyan only after a portion of a chromophore (chromogenic atomic group) is dissociated. In that case, the counter cation may be an inorganic cation such as an alkali metal or ammonium, an organic cation such as pyridinium or a quaternary ammonium salt, or a polymer cation having these cations in its structure.

Specific examples of preferred oil-soluble dyes include, although the invention is not limited thereto, C. I. Solvent Black 3, 7, 27, 29 and 34; C. I. Solvent Yellow 14, 16, 19, 29, 30, 56, 82, 93 and 162; C. I. Solvent Red 1, 3, 8, 18, 24, 27, 43, 49, 51, 72, 73, 109, 122, 132 and 218; C. I. Solvent Violet 3; C. I. Solvent Blue 2, 11, 25, 35, 38, 67 and 70; C. I. Solvent Green 3 and 7; and C. I. Solvent Orange 2.

Among these, particularly preferred are Nubian Black PC-0850, Oil Black HBB, Oil Yellow 129, Oil Yellow 105, Oil Pink 312, Oil Red 5B, Oil Scarlet 308, Vali Fast Blue 2606, Oil Blue BOS (manufactured by Orient Chemical Industries Co., Ltd.), Aizen Spilon Blue GNH (manufactured by Hodogaya Chemical Co., Ltd.), NeopenYellow 075, Neopen Mazenta SE1378, Neopen Blue 808, Neopen Blue FF4012, Neopen Cyan FF4238 (manufactured by BASF Japan Ltd.).

<Water-Soluble Dyes>

Examples of water-soluble dyes that may be used in the invention include acidic dyes and direct dyes. Acidic dyes and direct dyes have a structure including an acidic group as a solubilizing group. Examples of the acidic group include a sulfonic group and a salt thereof, a carboxylic group and a salt thereof, and a phosphoric group and a salt thereof. The number of acidic group may be one or more, and different acidic groups may be combined. Examples of the chemical structure of the chromophore included in the water-soluble dye include azo type, phthalocyanine type, triphenyl methane type, xanthene type, pyrazolone type, nitro type, stilbene type, quinoline type, methine type, thiazole type, quinonimine type, indigoid type, rhodamine type and anthraquinone type.

Specific examples of the preferred oil-soluble dyes include, although the invention is not limited thereto, C. I. Acid Yellow 19, C. I. Acid Red 37, C. I. Acid Blue 62, C. I. Acid Orange 10, C. I. Acid Blue 83, C. I. Acid Black 01, C. I. Direct Yellow 44, C. I. Direct Yellow 142, C. I. Direct Yellow 12, C. I. Direct Blue 15, C. I. Direct Blue 25, C. I. Direct Blue 249, C. I. Direct Red 81, C. I. Direct Red 9, C. I. Direct Red 31, C. I. Direct Black 154 and C. I. Direct Black 17.

<Disperse Dyes>

It is also possible to use a disperse dye in the invention in an amount of a range in which the disperse dye can dissolve in a water-immiscible organic solvent. Water-soluble dyes are generally included in disperse dyes, but it is preferred to use a disperse dye within a range in which the disperse dye can dissolve in a water-immiscible organic solvent.

Specific examples of preferred disperse dyes include C. I. Disperse Yellow 5, 42, 54, 64, 79, 82, 83, 93, 99, 100, 119, 122, 124, 126, 160, 184:1, 186, 198, 199, 201, 204, 224 and 237; C. I. Disperse Orange 13, 29, 31:1, 33, 49, 54, 55, 66, 73, 118, 119 and 163; C. I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356 and 362; C. I. Disperse Violet 33; C. I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; and C. I. Disperse Green 6:1 and 9.

Colorants that may be used in the invention may be used alone, or two or more kinds may be used in combination.

The content of component (C) in the ink composition may be selected as appropriate in consideration of physical properties of the colorant (specific gravity, coloring power, color hue etc.) or the conditions for printing (number of colors of ink compositions used in combination to produce print materials etc.), but is preferably from 0.1 to 30% by weight, more preferably from 0.5 to 20% by weight, particularly preferably from 1 to 10% by weight, with respect to the total weight of the ink composition.

(Dispersant)

In the invention, the colorant may be directly added with other components during preparation of the ink composition, or may be added as a pigment dispersion (also referred to as a mill base) which is previously prepared by adding and dispersing the colorant in a polar organic solvent that can be used in the invention.

In the ink composition according to the invention, a pigment is preferably used as the colorant. When a pigment is used, a dispersant is preferably included in order to stably dispersing the pigment in the ink composition.

The dispersant that may be used in the invention is preferably a polymer dispersant. In the present specification, "polymer dispersant" refers to a dispersant having a weight average molecular weight of 1,000 or more.

The main chain structure of the polymer dispersant is not particularly limited, and examples thereof include a polyurethane skeleton, a polyacryl skeleton, a polyester skeleton, a polyamide skeleton, a polyimide skeleton and a polyurea skeleton. Among these, from the viewpoint of storage stability of the ink composition, a polyurethane skeleton, a polyacryl skeleton and a polyester skeleton are preferred. The structure of the polymer dispersant is not particularly limited and examples thereof include a random structure, a block structure, a comb structure and a star structure. From the viewpoint of storage stability, a block structure and a comb structure are preferred.

Examples of the polymer dispersant include moistening dispersants DISPERBYK series 101, 102, 103, 106, 108, 109, 110, 111, 112, 116, 130, 140, 142, 145, 161, 162, 163, 164, 166, 167, 168, 170, 171, 174, 180, 182, 183, 184, 185, 2000, 2001, 2020, 2050, 2070, 2096 and 2150 (commercially available from BYK Japan K.K.); EFKA series 4008, 4009, 4010, 4015, 4020, 4046, 4047, 4050, 4055, 4060, 4080, 4300, 4330, 4340, 4400, 4401, 4402, 4403, 4406, 4800, 5010, 5044, 5054, 5055, 5063, 5064, 5065, 5066, 5070 and 5244 (commercially available from BASF Japan Ltd.); SOLSPERSE series 3000, 11200, 13240, 13650, 13940, 16000, 17000, 18000, 20000, 21000, 24000SC, 24000GR, 26000, 28000, 31845, 32000, 32500, 32550, 32600, 33000, 34750, 35100, 35200, 36000, 36600, 37500, 38500, 39000, 53095, 54000, 55000, 56000 and 71000 (commercially available from the Lubrizol Corporation); DISPERLON series 1210, 1220, 1831, 1850, 1860, 2100, 2150, 2200, 7004, KS-260, KS-273N, KS-860, KS-873N, PW-36, DN-900, DA-234, DA-325, DA-375, DA-550, DA-1200, DA-1401 and DA-7301 (commercially available from Kusumoto Chemicals Ltd.); AJISPER series PB-711, PB-821, PB-822, PN-411 and PA-111 (commercially available from Ajinomoto Fine-Techno Co., Inc.); SURFINOL series 104A, 104C, 104E, 104H, 104S, 104BC, 104DPM, 104PA, 104PG-50, 420, 440, DF110D, DF110L, DF37, DF58, DF75, DF210, CT111, CT121, CT131, CT136, GA, TG and TGE (commercially available from Air Products Japan. Inc.); OLFINE series STG and E1004 (commercially available from Nissin Chemical Industry Co., Ltd.); SN SPERSE series 70, 2120 and 2190 (commercially available from San Nopco Limited); ADEKA COL and ADEKA TOL series (commercially available from ADEKA Corporation); SANNONIC series, NAROACTY CL series, EMULMIN series, NEWPOL PE series, IONET M series, IONET D series, IONET S series, IONET T series and SANSEPARA 100 (commercially available from Sanyokasei Co., Ltd.)

In addition to the commercial products as mentioned above, it is also possible to use a polymer dispersant synthesized by copolymerizing a cationic monomer having a basic group, an anionic monomer having an acidic group, a monomer having a hydrophobic group, and an optional monomer such as a nonionic monomer or a monomer having a hydrophilic group. Details and specific examples of the cationic monomer, the anionic monomer, the monomer having a hydrophobic group, the nonionic monomer and the monomer having a hydrophilic group are described in paragraph [0034] to [0036] of JP-A No. 2004-250502.

The polymer dispersant preferably has a hydrophobic group in the molecule, and is more preferably insoluble in water. By using a polymer dispersant having a hydrophobic group, water resistance of a recording material can be further improved. Preferred examples of the polymer dispersant include polyester-type dispersants having a polyester chain in the molecule. By including a flexible polyester chain, adsorbability with respect to a pigment is increased and dispersibility is improved. Specific examples of the suitable dispersant having a polyester chain include compounds obtained by reacting polyalkylene imine with a polyester compound described in JP-A No. 54-37082 and JP-A No. 61-174939; compounds obtained by modifying an amino group in a side chain of a polyallylamine with polyester described in JP-A No. 9-196821; graft polymers obtained by using a polyester-type macromonomer described in JP-A No. 9-171253; and polyester polyol-added polyurethane described in JP-A No. 60-166318.

Example of the polyester-type polymer dispersant include SOLSPERSE (for example, SOLSPERSE 17000, 24000GR, 28000, 32000 and 38500) manufactured by the Lubrizol Corporation; DISPERBYK series (for example, DISPERBYK-161, 162, 167 and 168) manufactured by BYK Japan K.K.; EFKA series (for example, EFKA 4047 and 4050) manufactured by BASF Japan Ltd.; and AJISPER series (for example, AJISPER PB711, PN411, PA 111, PB821 and PB822) manufactured by Ajinomoto Fine-Techno Co., Inc. All products mentioned above are commercially available.

Among these polymer dispersants, dispersants having an absolute value of difference in the acid value and the amine value of from 0 mgKOH/g to 100 mgKOH/g are preferred, more preferably from 0 mgKOH/g to 60 mgKOH/g, further preferably from 0 mgKOH/g to 30 mgKOH/g.

The acid value is an acid value per gram of a solid content of the polymer dispersant, and can be obtained by potentiometric titration according to JIS K 0070.

The amine value is an amine value per gram of a solid content of the polymer dispersant, and can be obtained by calculating by potentiometric titration with 0.1N aqueous hydrochloric acid, and then converting the value to an equivalent amount with respect to potassium hydroxide.

When plural kinds of dispersants are used, the absolute value can be expressed by a weight average value of the dispersants.

The amount of the dispersant in the ink composition is preferably determined such that the weight ratio (D/P), wherein P is the weight of the pigment in the ink composition and D is the weight of the polymer dispersant in the ink composition, satisfies $0.01 \leq D/P \leq 2.0$, more preferably $0.03 \leq D/P \leq 1.5$, further preferably $0.05 \leq D/P \leq 0.6$. When the weight ratio (D/P) is within this range, aggregation or settling of the pigment or increase in the ink viscosity can be suppressed, and an ink composition having excellent storage stability, low ink viscosity and excellent discharge stability can be obtained.

In addition to a dispersant, it is also preferable to add a dispersion aid commonly referred to as a synergist (such as SOLSPERSE 5000, 12000 or 22000 available from the Lubrizol Corporation or EFKA 6745 available from BASF Japan K.K.), a surfactant or a defoaming agent, during a dispersion process in order to improve the dispersibility or wettability of the pigment.

In the invention, the pigment is preferably dispersed by preparing a mixture of the pigment and a dispersant and then adding the mixture to a polar organic solvent, or by preparing a mixture of a polar organic solvent and a dispersant and then adding and dispersing the pigment to the mixture. The dispersion can be performed with various kinds of dispersion machines such as a ball mill, a bead mill, a sand mill, a salt mill, an attritor, a roll mill, an agitator, a henschel mixer, a colloid mill, a supersonic homogenizer, a pearl mill, a wet-type jet mill and a paint shaker. Among these, a bead mill is preferable due to its excellent dispersion performance.

The beads to be used with a bead mill preferably has a volume-average diameter of from 0.01 to 3.0 mm, more preferably from 0.05 to 1.5 mm, further preferably from 0.1 to 1.0 mm, from the viewpoint of obtaining a pigment dispersion having excellent stability.

(Solvent that is Different from Component (B))

The ink composition according to the invention preferably includes a solvent that is a different solvent from the component (B) (hereinafter, also referred to as component (D)). Examples of the solvent that is different from the component (B) include solvents such as alcohol compounds, ketone compounds, ester compounds, amine compounds, glycol compounds, glycol ether compounds and aromatic compounds, hydrocarbon solvents, and water.

<Glycol Ether>

Component (D) that may be used in the ink composition according to the invention is preferably a glycol ether. By including a glycol ether in the ink composition, dischargeability can be further improved. The reason for this is not clear, but the inventors consider it as follows. However, the following description is only a presumption and the invention is not limited thereto. Specifically, it is considered that by using a glycol ether as component (D) in combination with component (B), the dispersed state of component (C) is maintained; precipitation of the ink composition is suppressed due to improved miscibility of component (A) and component (B); and evaporation of the solvent near the nozzle of inkjet head is made appropriate, and as a result, dischargeability or the like is further improved.

The glycol ether is a compound having a structure represented by the following Formula (4) in the molecule.

(4)

In Formula (4), k is an integer of 2 or 3, and n is an integer from 1 to 4.

Examples of the glycol ethers suitably used as component (D) include a monoalkyl ether or a dialkyl ether of either polyoxyethylene glycol or polyoxypropylene glycol. More specifically, organic solvents represented by the following Formula ($\alpha$), ($\beta$) or ($\gamma$) are preferred.

As an organic solvent, polyoxyethylene glycol dialkylether represented by the following Formula ($\alpha$) is preferred.

$$R^{21}—(OC_2H_4)_n—OR^{22} \quad \text{Formula }(\alpha)$$

In Formula ($\alpha$), each of $R^{21}$ and $R^{22}$ independently represents an alkyl group having 1 to 3 carbon atoms. n represents an integer from 1 to 4, preferably 2 or 3.

The alkyl group having 1 to 3 carbon atoms represented by $R^{21}$ and $R^{22}$ may have a linear structure or a branched structure, and examples thereof include a methyl group, an ethyl group and a propyl group.

Specific examples of polyoxyethylene glycol dialkyl ether represented by Formula (α) include diethylene glycol dimethyl ether, triethylene glycol dimethyl ether, tetraethylene glycol dimethyl ether, diethylene glycol diethyl ether, triethylene glycol diethyl ether, tetraethylene glycol diethyl ether, diethylene glycol ethyl methyl ether, triethylene glycol ethyl methyl ether, tetraethylene glycol ethyl methyl ether, diethylene glycol-di-n-propyl ether and diethylene glycol-di-isopropyl ether. Among these, diethylene glycol diethyl ether, triethylene glycol dimethyl ether and diethylene glycol ethyl methyl ether are preferred.

Specific examples of polyoxypropylene glycol dialkyl ether represented by Formula (α) include propylene glycol dimethyl ether, propylene glycol diethyl ether and dipropylene glycol dimethyl ether.

Preferred organic solvents include polyoxyethylene glycol monoalkyl ether and polyoxypropylene glycol monoalkyl ether. Specifically, polyoxyethylene glycol monoalkyl ether represented by Formula (β) and/or polyoxypropylene glycol monoalkyl ether represented by Formula (γ) is preferred.

$R^{31}-(OC_2H_4)_n-OH$  Formula (β)

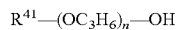

$R^{41}-(OC_3H_6)_n-OH$  Formula (γ)

In Formula (β), $R^{31}$ represents an alkyl group having 1 to 6 carbon atoms. n represents an integer from 1 to 6. $R^{31}$ may have a linear structure or a branched structure. Among the alkyl groups having 1 to 6 carbon atoms represented by $R^{3l}$, alkyl groups having 1 to 4 carbon atoms, such as a methyl group, an ethyl group, a propyl group and a butyl group, are preferred.

Examples of polyoxyethylene glycol monoalkyl ether represented by Formula (β) include triethylene glycol monomethyl ether, triethylene glycol monobutyl ether, tetraethylene glycol monomethyl ether, tetraethylene glycol monobutyl ether, pentaethylene glycol monomethyl ether and hexaethylene glycol monomethyl ether.

In Formula (γ), $R^{41}$ represents an alkyl group having 1 to 4 carbon atoms. n represents an integer of 2 or 3. $R^{41}$ may have a linear structure or a branched structure. Among the alkyl groups having 1 to 4 carbon atoms represented by $R^{41}$, for example, a methyl group, an ethyl group, a propyl group and a butyl group are preferred.

Examples of polyoxypropylene glycol monoalkyl ether represented by Formula (γ) include polypropylene glycol monoalkyl ether, dipropylene glycol monomethyl ether, dipropylene glycol monoethyl ether, dipropylene glycol monopropyl ether, dipropylene glycol monobutyl ether and tripropylene glycol monomethyl ether.

In addition to the above, monoalkyl ether monoalkyl ester compounds of (poly)alkylene glycol may be mentioned. Specific examples thereof include diethylene glycol monomethyl ether monomethyl ester, diethylene glycol monoethyl ether monomethyl ester, diethylene glycol monomethyl ether monoethyl ester, diethylene glycol monomethyl ether monobutyl ester, diethylene glycol monobutyl ether monomethyl ester, diethylene glycol monobutyl ether monoethyl ester, dipropylene glycol monomethyl ether monomethyl ester, dipropylene glycol monoethyl ether monomethyl ester, dipropylene glycol monobutyl ether monomethyl ester, dipropylene glycol monoethyl ether monoethyl ester, dipropylene glycol monoethyl ether monobutyl ester, triethylene glycol monomethyl ether monomethyl ester, triethylene glycol monoethyl ether monomethyl ester, triethylene glycol monobutyl ether monomethyl ester, tetraethylene glycol monomethyl ether monomethyl ester, tetraethylene glycol monoethyl ether monomethyl ester, and tetraethylene glycol monobutyl ether monomethyl ester.

Among these, di- or tripropylene glycol compounds are higher in safety compared with di- or triethylene glycol compounds, and are thus particularly suitable for an ink solvent.

It is more preferred to use an organic solvent represented by Formula (α) as component (D), in terms of compatibility with component (A) and component (B), dispersibility of component (C), or the like.

The compound represented by Formula (α) preferably has a boiling point at atmospheric pressure of 150° C. or higher, more preferably 180° C. or higher. The upper limit of the boiling point is not particularly limited, but is preferably 240° C. or less in view of the functional capability for inkjet recording. Further, the compound preferably has a density at 20° C. of 0.9 g/cm³.

The compound represented by Formula (β) preferably has a boiling point at atmospheric pressure of from 200 to 305° C., more preferably from 240 to 305° C., from the viewpoint of imparting an ability of suppressing evaporation to the ink composition.

The compound represented by Formula (γ) preferably has a boiling point at atmospheric pressure of from 170 to 245° C., more preferably from 180 to 240° C., from the viewpoint of imparting an ability of suppressing evaporation to the ink composition.

Preferred examples of the compound represented by Formula (α) used in the ink composition according to the invention include diethylene glycol diethyl ether and triethylene glycol diethyl ether, and preferred examples of the compound represented by Formula (β) and Formula (γ) include dipropylene glycol monomethyl ether and triethylene glycol monomethyl ether.

In addition to the above compounds, triethyl citrate is also useful as a preferred organic solvent in view of imparting an ability of suppressing evaporation to the ink composition.

The total content of component (B) and component (D) in the ink composition according to the invention is preferably 50% by weight or more, more preferably 70% by weight or more. When the proportion of the solvent is within this range, adhesiveness of an image formed from the ink composition according to the invention with respect to a support can be improved.

In the ink composition according to the invention, provided that the total amount of component (A) is 100 parts by weight, the total amount of component (B) is preferably from 100 to 1,000 parts by weight, more preferably from 300 to 800 parts by weight.

Further, provided that the total amount of component (A) is 100 parts by weight, the total amount of component (D) is preferably from 50 to 2,000 parts by weight, more preferably from 50 to 1,000 parts by weight, particularly preferably from 100 to 500 parts by weight.

Provided that the total amount of component (A) is 100 parts by weight, the total amount of component (B) and component (D) is preferably from 100 to 2,000 parts by weight, more preferably from 200 to 1,500 parts by weight.

<Hydrocarbon Solvent>

Hydrocarbon solvents may be included in the ink composition according to the invention as component (D). When a hydrocarbon solvent is used, the amount thereof is preferably from 1 to 30% by weight, more preferably from 3 to 20% by weight, with respect to the total organic solvent.

A hydrocarbon solvent is a compound formed only of carbon atoms and hydrogen atoms. A hydrocarbon solvent is a natural or synthetic distillate from a hydrocarbon mixture that is typically formed of a single component or a mixture of two or more components. There are hydrocarbon solvents having different molecular structures, including alkanes, alkynes, cycloalkanes and aromatic hydrocarbons.

Examples of the hydrocarbon solvent include paraffins such as normal paraffin and iso paraffin, naphthene, and a paraffin/naphthene mixed system. The hydrocarbon solvent may be fluid or solid. Among these, iso paraffin solvents, normal paraffin solvents, fluid paraffin solvents and paraffin/naphthene solvents are preferred, and these hydrocarbon solvents are easily available as commercial products.

(Other Components)

As necessary, the ink composition according to the invention may include, in addition to components (A), (B) and (C), known additives such as a polymer binder, a polymerizable compound, a photopolymerization initiator, a sensitizing dye, a surfactant, a surface modifier, a leveling agent, a defoaming agent, an antioxidant, a pH adjuster, a charge-imparting agent, a fungicide, an antiseptic, a deodorizer, a charge-adjusting agent, a wetting agent, an anti film-formation agent, a fragrance or a pigment derivative, as long as the effect of the invention is not impaired.

<Polymer Binder>

The ink composition according to the invention may include a polymer binder. The polymer binder is not particularly limited, and any polymer compound may be used as long as it can be dissolved or dispersed in the ink composition, and exhibits an ability of forming a film after the formation of an image. Specific examples of the polymer binder include polyacrylate, polyurethane, polyester and polyether. Preferably, a polyacrylate as a homopolymer or a copolymer of alkyl (meth)acrylate is preferably used as the polymer binder. From the viewpoint of adjusting the physical properties of a film formed from the ink composition after the formation of an image, a polymer binder is preferably included in the ink composition according to the invention.

<Sensitizing Dye>

The ink composition according to the invention may include a sensitizing dye. The sensitizing dye is not particularly limited as long as it is a compound that can promote the photo-crosslinking reaction of component (A) by spectral sensitization. Specific examples thereof include thioxanthones, benzophenones, thiochromanones, Michler's ketone, anthraquinones, anthracene, chrysene, p-dinitrobenzene, 2-nitrofluorenone, and merocyanines described in JP-A No. 6-107718. Among these, in the invention, thioxanthones, benzophenones and merocyanines are preferably used, and thioxanthones such as isopropyl thioxanthone and diethyl thioxanthone are more preferably used. From the viewpoint of solvent resistance after the formation of an image, a sensitizing dye is preferably included in the ink composition according to the invention.

(Method of Preparing Ink Composition)

The method of preparing the ink composition according to the invention is not particularly limited. For example, the ink composition can be prepared by stirring, mixing and dispersing the components in a container-driving medium mill such as a ball mill, a centrifugal mill or a planetary ball mill, a high-speed rotation mill such as a sand mill, a medium mixing mill such as a mixing vessel-type mill, or a simple dispersing apparatus such as a disper. The order of adding each component can be arbitrarily determined. Preferably, an azo pigment represented by Formula (1), a polymer dispersant and an organic solvent are premixed and subjected to a dispersion treatment, and the obtained dispersant is mixed with a resin (such as an anionic resin) and an organic solvent. In that case, uniform mixing is performed using a simple mixer such as a three-one motor, a magnetic a stirrer, a disper or a homogenizer either at the time of addition or after addition of the dispersant. The mixing may be performed using a mixing machine such as a line mixer. In order to micronize the dispersed particles more finely, the mixing may be performed using a dispersing machine such as a bead mill or a high-pressure jet mill. Depending on the type of the pigment or the polymer dispersant, the anionic resin may be added at the time of performing premixing prior to dispersing the pigment.

The ink composition according to the invention preferably has a surface tension at 25° C. of from 20 to 40 mN/m. The surface tension is measured at 25° C. with an automatic surface tensiometer (CBVP-Z, trade name, manufactured by Kyowa Interface Science Co., Ltd.) The viscosity of the ink composition is preferably from 1 to 40 mPa·s, preferably from 3 to 30 mPa·s. The viscosity of the ink composition is measured at 25° C. with a viscometer (TV-22, trade name, Toki Sangyo Co., Ltd.)

[Inkjet Recording Method]

The inkjet recording method according to the invention includes an ink application step in which the ink composition is applied onto a recording medium, and a light exposure step in which the ink composition is exposed to light. By performing these steps, an image is formed from the ink composition fixed on the recording medium.

<Ink Application Step>

In the following, the ink application step in the inkjet recording method according to the invention will be explained. In the invention, the ink application step is not particularly limited as long as it is a step in which the ink composition is applied onto a recording medium.

The inkjet recording apparatus used in the inkjet recording method according to the invention is not particularly limited, and any known inkjet recording apparatus that can achieve a desired resolution can be selected and used. In other words, any known inkjet recording apparatuses, including commercial products, can be used for discharging the ink composition onto a recording medium by the inkjet recording method according to the invention.

One example of the inkjet recording apparatus that can be used in the invention is an apparatus having an ink supply system, a temperature sensor and a heating means.

The ink supply system has, for example, a main tank that contains the ink composition according to the invention, supply piping, an ink supply tank positioned immediately in front of an inkjet head, a filter, and a piezo-type inkjet head. The piezo-type inkjet head can be driven to discharge multi-size dots of from preferably 1 to 100 pl, more preferably from 8 to 30 pl, at a resolution of preferably from 320×320 to 4,000×4,000 dpi, more preferably from 400×400 to 1,600×1,600 dpi, further preferably from 720×720 dpi. The "dpi" in the invention refers to the number of dots per 2.54 cm.

Since the temperature of the ink composition is preferably maintained constant when it is discharged, the inkjet recording apparatus preferably includes a stabilizing means that maintains the temperature of the ink composition stable. The portion at which the temperature needs to be constant includes the entire portion of the piping system and the members ranging from the ink tank (when an intermediate tank is provided, from the intermediate tank) to a nozzle discharge surface. In other words, insulating or heating can be performed in a range from an ink supply tank to an inkjet head portion.

The method of controlling the temperature is not particularly limited. However, for example, it is preferred to control heating by providing plural temperature sensors at each piping portion according to the flow rate of ink composition or the environment temperature. The temperature sensors are preferably provided in the vicinity of the ink supply tank and nozzles of the inkjet head. The head unit to be heated is preferably thermally insulated so as to avoid being affected by the temperature outside the apparatus. Further, in order to shorten the time for launching the printer that is necessary for heating, or to reduce the loss of thermal energy, it is preferred to reduce the thermal capacity of the whole heating unit, in addition to insulating the other members.

The ink composition is discharged using the inkjet recording apparatus as described above after heating the ink composition to a range of preferably from 25 to 80° C., more preferably from 25 to 50° C., and lowering the viscosity of the ink composition to a range of preferably from 3 to 15 mPa·s, more preferably from 3 to 13 mPa·s. In particular, an ink composition having a viscosity at 25° C. of 50 mPa·s or less is preferably used as the ink composition according to the invention, since favorable discharge can be carried out. According to this method, a high degree of discharge stability can be achieved.

The change in viscosity of the ink composition may greatly affect the change in the size of droplets or the change in the rate of discharging the droplets, whereby deterioration of image quality may be caused. Accordingly, it is necessary to maintain the temperature of the ink composition during discharging as constant as possible. Therefore, in the invention, it is appropriate to control the temperature of the ink composition to a range of preferably ±5° C. of the set temperature, more preferably ±2° C. of the set temperature, further preferably ±1° C. of the set temperature.

In the invention, the recording medium is not particularly limited and any known recording media may be used as a support or a recording material. Examples of the recording medium include paper, paper coated with a plastic (such as polyethylene, polypropylene or polystyrene), metal plates (such as aluminum, zinc or copper), plastic films (such as polyvinyl chloride, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate and polyvinyl acetal), and paper or plastic films on which metal as mentioned above is laminated or evaporated. Among these, the ink composition according to the invention, which exhibits excellent adhesiveness, is suitably used with a non-absorbing recording medium. From the viewpoint of adhesiveness, a plastic support of polyvinyl chloride, polyethylene terephtharate, polyethyelne or the like is preferred, a polyvinyl chloride support is more preferred, and a sheet or film of polyvinyl chloride resin is further preferred.

<Light Exposure Step>

In the following, the light exposure step in the inkjet recording method according to the invention will be explained. The light exposure step in the invention is not particularly limited as long as it is a step in which the ink composition that has been applied onto the recording medium is exposed to light. By exposing the ink composition to light, crosslinking reaction of a compound in the ink composition is promoted and an image is fixed, thereby making it possible to improve solvent resistance or the like of a printed material. By carrying out the light exposure step, crosslinking reaction of component (A) is caused and a crosslinked structure represented by the following Formula (5) is formed in the ink composition.

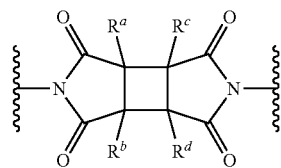

In Formula (5), each of $R^a$, $R^b$, $R^c$ and $R^d$ independently represents an alkyl group having 1 to 4 carbon atoms, and $R^a$ and $R^b$ may be bonded to each other to form a four- or six-membered ring. $R^c$ and $R^d$ may be bonded to each other to form a four- or six-membered ring. $R^a$ and $R^b$ have the same definitions as that of $R^a$ and $R^b$ in Formula (1), including the preferred ranges thereof. $R^c$ has the same definitions as that of $R^c$ in Formula (1), including the preferred ranges thereof. $R^d$ has the same definitions as that of $R^d$ in Formula (1), including the preferred ranges thereof.

Examples of light that can be used in the light exposure step include ultraviolet rays (hereinafter, also referred to as UV light), visible rays and electron beams, and UV light is preferably used.

Although it depends on the absorption properties of a sensitizing dye that is optionally used, the peak wavelength of UV light is preferably from 200 to 405 nm, more preferably from 250 to 405 nm, further preferably from 250 to 390 nm.

The output of UV light is preferably 2,000 mJ/cm$^2$ or less, more preferably from 10 mJ/cm$^2$ to 2,000 mJ/cm$^2$, further preferably from 20 mJ/cm$^2$ to 1,000 mJ/cm$^2$, particularly preferably from 50 mJ/cm$^2$ to 800 mJ/cm$^2$.

Further, it is appropriate to carry out UV light exposure with an illuminance at an exposed side of, for example, from 10 mW/cm$^2$ to 2,000 mW/cm$^2$, preferably from 20 mW/cm$^2$ to 1,000 mW/cm$^2$.

As a UV light source, mercury lamps, gas/solid lasers or the like are mainly used, and mercury lamps and metal halide lamps are widely known. Further, a shift to GaN semiconductor ultraviolet light emitting devices is very effective in view of industry or environment, and use of LED (UV-LED) and LD (UV-LD) as a UV light source is expected due to their small size, long life, high efficiency and low cost.

The ink composition according to the invention is suitably exposed to UV light as described above for a period of, for example, from 0.01 seconds to 120 seconds, preferably from 0.1 seconds to 90 seconds.

The conditions and a basic method for carrying out exposure are described in JP-A No. 60-132767. Specifically, exposure is preferably carried out by a method in which a light source is provided at both sides of a head unit including a unit from which ink is discharged and the head unit and the light source are scanned in a shuttle method; and a method in which the scanning is carried out by a different light source that is not driven. The exposure with actinic radiation rays is carried out for a certain period of time (such as from 0.01 seconds to 60 seconds, preferably from 0.01 seconds to 30 seconds, more preferably from 0.01 seconds to 15 seconds) after depositing and thermally fixing the ink.

<Heating and Drying Step>

The ink composition that has been discharged onto a recording medium is preferably fixed by evaporating component (B) and component (D) with a heating means. In the following, a step of fixing the discharged ink composition by heating is explained.

The heating means is not particularly limited as long as it can dry component (B) and component (D), and examples thereof include a heat drum, a hot air blower, an infrared lamp, a heat oven and a hot plate.

The temperature for heating is not particularly limited as long as component (B) and component (D) can be dried and a film of component (A) and an optionally added polymer binder can be formed. However, these effects can be achieved when the temperature is 40° C. or higher, preferably from approximately 40° C. to 150° C., more preferably from approximately 40° C. to 80° C. When the temperature is over 100° C., deformation of a recording medium may occur and malfunction during conveyance may be caused.

The time for drying/heating is not particularly limited as long as component (B) and component (D) in the ink composition can be dried and a film of a resin agent can be formed, and the time can be appropriately adjusted in consideration of the ingredients of the ink composition or a printing speed.

As necessary, the ink composition that has been fixed by heat may be further fixed by exposing the ink composition to UV light. It is preferred to perform UV light exposure in order to improve the strength, water resistance and solvent resistance of the printed material.

[Inkjet Printed Material]

The inkjet printed material according to the invention is obtained by recording an image by the inkjet recording method according to the invention. The printed material according to the invention, which is a printed material obtained by the inkjet recording method according to the invention, exhibits superior solvent resistance of the recorded image and adhesiveness thereof with respect to a support.

The following are exemplary embodiments of the invention.

<1> An ink composition for inkjet recording, including:

a component (A) that is a compound having two or more groups represented by the following Formula (1);

a component (B) that is at least one selected from the group consisting of an organic solvent represented by the following Formula (2) and an organic solvent represented by the following Formula (3); and (C) a colorant:

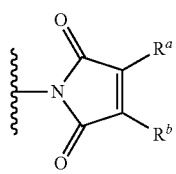

(1)

wherein in Formula (1), each of $R^a$ and $R^b$ independently represents an alkyl group having 1 to 4 carbon atoms, and $R^a$ and $R^b$ may be bonded to each other to form a four- to six-membered ring:

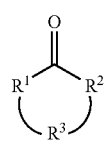

(2)

wherein in Formula (2), each of $R^1$ and $R^2$ independently represents $—CH_2—$, $—NR^6—$ or $—O—$; $R^1$ and $R^2$ are not both $—CH_2—$; $R^6$ represents an alkyl group having 1 to 3 carbon atoms, a hydroxyalkyl group having 1 to 3 carbon atoms, a hydroxyl group or a hydrogen atom; $R^3$ represents a hydrocarbon group represented by $—C_mH_{2m}—$, $—C_mH_{2m-2}—$ or $—C_mH_{2m-4}—$; and m is an integer from 2 to 8:

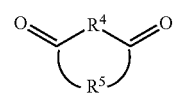

(3)

wherein in Formula (3), $R^4$ represents $—NR^7—$ or $—O—$; $R^7$ represents an alkyl group having 1 to 3 carbon atoms, a hydroxyalkyl group having 1 to 3 carbon atoms, a hydroxyl group or a hydrogen atom; $R^5$ represents a hydrocarbon group represented by $—C_nH_{2n}—$, $—C_nH_{2n-2}—$ or $—C_nH_{2n-4}—$; and n is an integer from 2 to 8.

<2> The ink composition according to <1>, wherein the component (A) is a polymer compound having the two or more groups represented by Formula (1) in a side chain or in side chains.

<3> The ink composition according to <1> or <2>, wherein the component (A) is a low-molecular compound having a molecular weight of from 300 to 2,000, and the low-molecular compound is represented by the following Formula (1-L):

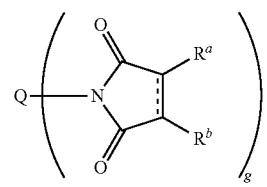

(1-L)

wherein in Formula (1-L), each of $R^a$ and $R^b$ independently represents an alkyl group having 1 to 4 carbon atoms; $R^a$ and $R^b$ may be bonded to each other to form a four- to six-membered ring; Q represents a g-valent linking group; and g is an integer of 2 or greater.

<4> The ink composition according to <1> or <2>, wherein the component (A) is a high-molecular compound having a weight average molecular weight of 5,000 or more, and the high-molecular compound is represented by the following Formula (1'):

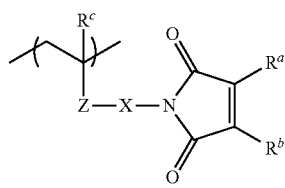

(1')

wherein in Formula (1'), each of $R^a$ and $R^b$ independently represents an alkyl group having 1 to 4 carbon atoms; $R^a$ and $R^b$ may be bonded to each other to form a four- to six-membered ring; $R^c$ represents a hydrogen atom or a methyl group; Z represents $—COO—$ or $—CONR^d—$; $R^d$ represents a hydrogen atom or an alkyl group having 1 to 4 carbon atoms; and X represents a divalent organic group.

<5> The ink composition according to any one of <1>, <2> and <4>, wherein the component (A) is a copolymer that includes a structure represented by the following Formula (A'):

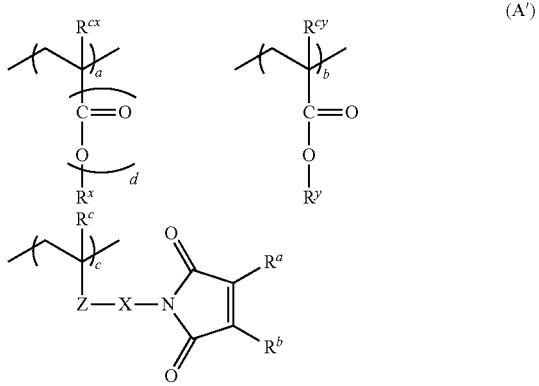

wherein in Formula (A'), each of $R^a$ and $R^b$ independently represents an alkyl group having 1 to 4 carbon atoms; $R^a$ and $R^b$ may be bonded to each other to form a four- to six-membered ring; each of $R^c$, $R^{cx}$ and $R^{cy}$ independently represents a hydrogen atom or a methyl group; each of $R^x$ and $R^y$ independently represents a hydrogen atom, an alkyl group having 1 to 10 carbon atoms or an aryl group having 6 to 20 carbon atoms; Z represents —COO— or —CONR$^d$—; $R^d$ represents a hydrogen atom or an alkyl group having 1 to 4 carbon atoms; X represents a divalent organic group; a, b and c represent the copolymerization ratio in the high-molecular compound, and the total of a, b and c is 100; and d is 0 or 1.

<6> The ink composition according to any one of <1> to <5>, wherein $R^1$ and $R^2$ in Formula (2) are —O—.

<7> The ink composition according to any one of <1> to <6>, wherein $R^3$ in Formula (2) is —$C_2H_4$— or —$C_3H_6$—.

<8> The ink composition according to any one of <1> to <7>, further comprising a glycol ether as a component (D) that is a different solvent from the component (B).

<9> The ink composition according to <8>, wherein the glycol ether is a monoalkyl ether or a dialkyl ether of either polyoxyethylene glycol or polyoxypropylene glycol.

<10> An inkjet recording method comprising:
applying the ink composition according to any one of <1> to <9> onto a recording medium;
drying the ink composition by heating; and
exposing the ink composition to light.

<11> A printed material obtained by the inkjet recording method according to <10>.

EXAMPLES

In the following, the invention will be explained in more detail with reference to the Examples. However, the invention is not limited to these Examples. Unless otherwise specified, "parts" and "%" are on the weight basis.

The following are the raw materials used to prepare the colorant dispersions and the ink compositions in the Examples and the Comparative Examples.

<Colorant>
IRGALITE BLUE GLVO (trade name, cyan pigment, C. I. Pigment Blue 15:3, manufactured by BASF Japan Ltd.)
CINQUASIA MAGENTA RT355D (trade name, magenta pigment, C. I. Pigment Red 42, manufactured by BASF Japan Ltd.)
NOVOPERM YELLOW 4G01 (trade name, yellow pigment, C. I. Pigment Yellow 155, manufactured by Clariant Japan K.K.)
SPECIAL BLACK 250 (trade name, black pigment, carbon black, manufactured by Evonik Degussa Japan Co., Ltd.)
KRONOS 2300 (trade name, white pigment, titanium oxide, manufactured by KRONOS)

<Solvent>
Propylene carbonate (4-methyl-2-oxo-1,3-dioxlolane, manufactured by Nippon Soda Co., Ltd.)
Ethylene carbonate (1,3-dioxolan-2-one, manufactured by Toagosei Co., Ltd.)
γ-butyrolactone (manufactured by BASF Japan Ltd.)
1,3-dimethyl-2-imidazolidinone (manufactured by Kawaken Fine Chemicals Co., Ltd.)
Dipropylene glycol monomethyl ether (manufactured by Toho Chemical Industry Co., Ltd.)
Diethylene glycol diethyl ether (manufactured by Toho Chemical Industry Co., Ltd.)
Triethylene glycol dimethyl ether (manufactured by Toho Chemical Industry Co., Ltd.)

<Polymer Dispersant>
AJISPER PB 821 (polyester-based polymer dispersant, manufactured by Ajinomoto Fine-Techno Co., Inc.)
SOLSPERSE 32000 (polyester-based polymer dispersant, manufactured by the Lubrizol Corporation)
SOLSPERSE 36000 (polyester-based polymer dispersant, manufactured by the Lubrizol Corporation)

<Polymer Binder>
ELVACITE 2013 (methyl methacrylate/butyl methacrylate copolymer, manufactured by Du Pont K.K.)

<Comparative Low-Molecular Compound C>
The comparative low-molecular compound C is a compound having the following structure.

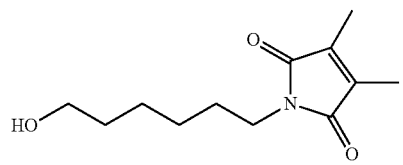 [SMILES: CC1=C(C)C(=O)N(CCCCCCO)C1=O]

The comparative low-molecular weight compound C was synthesized by a method described in paragraph [0068] of JP-A No. 5-88372.

Among the compounds used in the Examples and the Comparative Examples, compounds without indication of the manufacturer were synthesized by a known method, or by applying a known method.

<Preparation of Colorant Dispersion>
Colorant dispersions were prepared in accordance with the formulations shown in Table 1. The values of the formulation amounts in Table 1 refer to parts by weight.

Specifically, colorant dispersions A to F were prepared by mixing the components with a mixer until the resultant became homogenous, and further subjecting the obtained preliminary dispersants with a vertical bead mill (READY MILL, trade name, manufactured by Aimex Co., Ltd.) with zirconia beads having a diameter of 0.1 mm for from 3 to 6 hours.

TABLE 1

| | | Colorant Dispersions | | | | | |
| --- | --- | --- | --- | --- | --- | --- | --- |
| | | A | B | C | D | E | F |
| Colorant | IRGALITE BLUE GLVO | 35 | — | — | — | — | — |
| | CINQUASIA MAGENTA RT355D | — | 30 | — | — | — | 30 |
| | NOVOPERM YELLOW 4G01 | — | — | 30 | — | — | — |
| | SPECIAL BLACK 250 | — | — | — | 40 | — | — |
| | KRONOS2300 | — | — | — | — | 50 | — |
| Solvent | Propylene carbonate | 52.5 | 59 | 58 | 50 | 45 | — |
| | Triethylene glycol dimethyl ether | — | — | — | — | — | 59 |
| Polymer | AJISPER PB821 | 12.5 | — | — | — | — | — |
| Dispersant | SOLSPERSE 32000 | — | 11 | 12 | 10 | — | 11 |
| | SOLSPERSE 36000 | — | — | — | — | 5 | — |
| | Total Amount (parts by weight) | 100 | 100 | 100 | 100 | 100 | 100 |

The volume-average particle diameter of the colorant in the colorant dispersions was measured by a dynamic light scattering method using a particle size distribution analyzer (NANOTRAC UPA-EX150, trade name, manufactured by Nikkiso Co., Ltd.). The results were A (190 nm), B (180 nm), C (250 nm), D (360 nm), E (280 nm) and F (160 nm).

Examples 1 to 10 and Comparative Examples 1 to 3)

Preparation of Ink Composition>

Ink compositions of Examples 1 to 10 and Comparative Examples 1 to 3, having the compositions shown in Table 2, were prepared by mixing the obtained colorant dispersions A to F, respectively, with a mixer (L4R, trade name, manufactured by Silverson Machines, Inc.) at 2,500 rotations per minute. The obtained ink compositions were packed in a plastic disposable syringe, and filtered with a filter having a pore size of 5 μm made of polyvinilidene fluoride (PVDF), thereby obtaining finished inks. The values of formulation amounts in Table 2 refer to parts by weight. In Table 2, "A-3", "A-1" "1-1" are exemplary compounds previously described in the section regarding component (A).

Subsequently, a commercially available inkjet printer (SP-300V, trade name, manufactured by Roland DG Corporation) was provided as an inkjet recording apparatus.

Each of the obtained ink compositions was charged in the inkjet printer and an image was formed on a polyvinyl chloride sheet (AVERY 400 GLOSS WHITE PERMANENT, trade name, manufactured by Avery Dennison Japan K.K.), thereby obtaining a printed material for the following evaluation.

Further, the printed material was exposed to UV light with a metal halide lamp (MAN400L, manufactured by GS Yuasa Corporation, maximum wavelength: 365 nm, power: 120 W/cm).

The obtained ink compositions and the printed materials were subjected to the following evaluations. The results are shown in Table 2.

<Evaluation of Adhesiveness (Cross Hatch Test)>

The cross hatch test (JIS K 5600-5-6) was performed in order to evaluate the adhesiveness with respect to a support. A solid image, having an average thickness of 12 μm in the image portion, was formed according to the inkjet recording method as described above.

Thereafter, a cross hatch test of the printed materials was carried out. The evaluation was based on six grades from 0 to 5, according to JIS K 5600-5-6. In the evaluation, Grade 0 refers to a result in which cut edges are completely smooth and no exfoliation of grids occurs.

<Evaluation of Solvent Resistance>

After forming a solid image having an average thickness of 12 μm was formed according to the inkjet recording method, the surface of the printed material was scraped with a cotton swab soaked with isopropyl alcohol, and the result was evaluated according to the following criteria.

A: Image did not change even after 10 scrapes.

B: Image density decreased after 5 to 9 scrapes.

C: Image density decreased after 2 to 4 scrapes.

D: Image density significantly decreased after a single scrape.

<Evaluation of Dischargeability>

After discharging the ink from a head of the inkjet printer for 30 minutes and stopping the discharge for 5 minutes, an image (5 cm×5 cm) was obtained by recording a solid image and a fine line on a recording medium (AVERY 400 GLOSS WHITE PERMANENT, trade name, manufactured by Avery Dennison Japan K.K.) The obtained image was visually evaluated in accordance with the following criteria.

A: A favorable image was obtained without lack of dots due to occurrence of white deletion or the like.

B: A slight amount of lack of dots due to occurrence of white deletion or the like was observed, but it was tolerable for practical applications.

C: Lack of dots due to occurrence of white deletion or the like was observed, and it was problematic for practical applications.

D: Discharge of ink could not be performed

<Evaluation of Storage Stability of Ink Composition>

The obtained ink composition was placed in a container and sealed, and was allowed to stand for two weeks at 60° C. Thereafter, evaluation of dischargeability was carried out in a similar manner to the above, and the results were evaluated in accordance with the same criteria.

TABLE 2

|  |  | EXAMPLES |  |  |  |  |  |  |  |  |  | COMPARATIVE EXAMPLES |  |  |
|---|---|---|---|---|---|---|---|---|---|---|---|---|---|---|
|  |  | 1 | 2 | 3 | 4 | 5 | 6 | 7 | 8 | 9 | 10 | 1 | 2 | 3 |
| Component A | A-3 (high-molecular) | 15 | 15 | 15 | 15 | 15 | 15 | 15 | 15 | — | — | — | 15 | — |
|  | A-1 (high-molecular) | — | — | — | — | — | — | — | — | 15 | — | — | — | — |
|  | 1-1 (low-molecular) | — | — | — | — | — | — | — | — | — | 2 | — | — | — |
|  | Comparative low-molecular compound C (comparative example) | — | — | — | — | — | — | — | — | — | — | — | — | 2 |
| Component B | Propylene carbonate | 72.6 | 36.3 | — | 52.6 | 45.3 | — | — | 24 | 53.6 | 53.6 | 53.6 | — | 53.6 |
|  | Ethylene carbonate | — | 36.3 | — | — | — | — | — | 15 | — | — | — | — | — |
|  | γ-butyrolactone | — | — | — | — | — | 52.6 | — | — | — | — | — | — | — |
|  | 1,3-dimethyl-2-imidazolidinone | — | — | 72.6 | — | — | — | 52.6 | — | — | — | — | — | — |
| Component C | Colorant dispersion A | 11.4 | 11.4 | 11.4 | 11.4 | — | — | — | — | 11.4 | 11.4 | 11.4 | — | 11.4 |
|  | Colorant dispersion B | — | — | — | — | 18.7 | — | — | — | — | — | — | — | — |
|  | Colorant dispersion C | — | — | — | — | — | 11.4 | — | — | — | — | — | — | — |
|  | Colorant dispersion D | — | — | — | — | — | — | 11.4 | — | — | — | — | — | — |
|  | Colorant dispersion E | — | — | — | — | — | — | — | 25 | — | — | — | — | — |
|  | Colorant dispersion F | — | — | — | — | — | — | — | — | — | — | — | 11.4 | — |
| Component D | Diethylene glycol diethyl ether | — | — | — | 20 | 20 | 20 | 15 | 20 | 20 | 15 | 20 | 53.6 | 15 |
|  | Dipropylene glycol monomethyl ether | — | — | — | — | — | — | 5 | — | — | — | — | 20 | — |
|  | Triethylene glycol dimethyl ether | — | — | — | — | — | — | — | — | — | 5 | — | — | 5 |
| Polymer Binder | ELVACITE 2013 | — | — | — | — | — | — | — | — | — | 13 | 15 | — | 13 |
| Sensitizing Dye | Isopropyl thioxanthone | 1 | 1 | 1 | 1 | 1 | 1 | 1 | 1 | — | — | — | — | — |
| Evaluation | Adhesiveness | 1 | 1 | 1 | 1 | 1 | 1 | 1 | 0 | 1 | 2 | 4 | 3 | 2 |
|  | Solvent-resistance (after UV exposure) | A | A | B | A | A | A | A | A | A | B | D | B | D |
|  | Dischargeability | B | B | B | A | A | A | A | A | A | A | C | C | C |
|  | Storage stability | B | B | B | A | A | A | A | A | A | A | C | D | C |

As shown in Table 2, the Examples exhibited favorable effects in all of adhesiveness, solvent resistance and dischargeability. On the other hand, none of the Comparative Examples exhibited favorable effects in all of adhesiveness, solvent resistance and dischargeability. Moreover, from the results of Examples 4 to 9, it was proved that an even better effect was obtained when a polymer compound was used as component (A) and a glycol ether was used as component (D). In addition, from the results of Examples 4 to 10, it was proved that an even better effect in terms of improving storage stability was obtained when component (D) was used.

JP-A No. 2002-241702 relates to a technique concerning an outside paint composition, and dischargeability of the ink composition during forming an image by an inkjet method is not considered. Further, when a solvent-based pigment ink disclosed in JP-A No. 2000-38533 and JP-A No. 2001-329193 is used for recording an image, there is still room to improve solvent resistance or the like of the image portion. Further, in these techniques, sufficient study has not been made in terms of improving adhesiveness of a recorded image with respect to a support.

According to the invention, it is possible to provide an ink composition for inkjet recording that exhibits superior dischargeability when an image is recorded by an inkjet method, and exhibits superior solvent resistance of the recorded image and adhesiveness of the recorded image with respect to a support.

All publications, patent applications, and technical standards mentioned in this specification are herein incorporated by reference to the same extent as if each individual publication, patent application, or technical standard was specifically and individually indicated to be incorporated by reference.

What is claimed is:

1. An ink composition for inkjet recording, comprising: a copolymer consisting of the following repeating units:

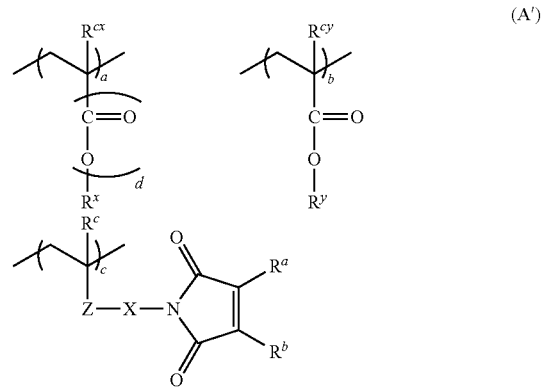

(A')

wherein in Formula (A'), each of $R^a$ and $R^b$ independently represents an alkyl group having 1 to 4 carbon atoms; $R^a$ and $R^b$ may be bonded to each other to form a four- to six-membered ring; each of $R^c$, $R^{cx}$ and $R^{cy}$ independently represents a hydrogen atom or a methyl group; each of $R^x$ and $R^y$ independently represents a hydrogen atom, an alkyl group having 1 to 10 carbon atoms or an aryl group having 6 to 20 carbon atoms; Z represents —COO— or —CONR$^d$—; $R^d$ represents a hydrogen atom or an alkyl group having 1 to 4 carbon atoms; X represents a divalent organic group; a, b and c represent the copolymerization ratio in the copolymer, and the total of a, b and c is 100, and a, b and c satisfy the relationship of $30 \leq a+b \leq 90$ and $10 \leq c \leq 70$; and d is 0 or 1;

a component (B) that is at least one selected from the group consisting of an organic solvent represented by the following Formula (2) and an organic solvent represented by the following Formula (3):

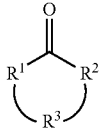
(2)

wherein in Formula (2), each of $R^1$ and $R^2$ independently represents —$CH_2$—, —$NR^6$— or —O—; $R^1$ and $R^2$ are not both —$CH_2$—; $R^6$ represents an alkyl group having 1 to 3 carbon atoms, a hydroxyalkyl group having 1 to 3 carbon atoms, a hydroxyl group or a hydrogen atom; $R^3$ represents a hydrocarbon group represented by —$C_mH_{2m}$—, —$C_mH_{2m-2}$— or —$C_mH_{2m-4}$—; and m is an integer from 2 to 8:

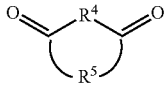
(3)

wherein in Formula (3), $R^4$ represents —$NR^7$— or —O—; $R^7$ represents an alkyl group having 1 to 3 carbon atoms, a hydroxyalkyl group having 1 to 3 carbon atoms, a hydroxyl group or a hydrogen atom; $R^5$ represents a hydrocarbon group represented by —$C_nH_{2n}$—, —$C_nH_{2n-2}$— or —$C_nH_{2n-4}$—; and n is an integer from 2 to 8; and (C) a colorant.

2. The ink composition according to claim 1, wherein $R^1$ and $R^2$ in Formula (2) are —O—.

3. The ink composition according to claim 1, wherein $R^3$ in Formula (2) is —$C_2H_4$— or —$C_3H_6$—.

4. The ink composition according to claim 1, further comprising a glycol ether as a component (D) that is a different solvent from the component (B).

5. The ink composition according to claim 4, wherein the glycol ether is a monoalkyl ether or a dialkyl ether of either polyoxyethylene glycol or polyoxypropylene glycol.

6. An inkjet recording method comprising:
applying the ink composition according to claim 1 onto a recording medium;
drying the ink composition by heating; and
exposing the ink composition to light.

7. A printed material obtained by the inkjet recording method according to claim 6.

* * * * *